(12) United States Patent
Bernstein et al.

(10) Patent No.: US 8,407,568 B2
(45) Date of Patent: Mar. 26, 2013

(54) METHOD AND SYSTEM FOR A SOFT-OUTPUT NORDSTROM-ROBINSON DECODER

(75) Inventors: Zvi Bernstein, San Jose, CA (US); Mike Grimwood, Palo Alto, CA (US); Li Yan, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 633 days.

(21) Appl. No.: 12/551,102

(22) Filed: Aug. 31, 2009
(Under 37 CFR 1.47)

(65) Prior Publication Data

US 2011/0051857 A1   Mar. 3, 2011

(51) Int. Cl.
*H03M 13/45* (2006.01)

(52) U.S. Cl. ........................................................ 714/780

(58) Field of Classification Search ................... 714/780
See application file for complete search history.

(56) References Cited

U.S. PATENT DOCUMENTS

| | | | | |
|---|---|---|---|---|
| 4,896,353 A | * | 1/1990 | Dehgani et al. | 714/755 |
| 2009/0282313 A1 | * | 11/2009 | Yang et al. | 714/752 |

* cited by examiner

*Primary Examiner* — Stephen M Baker
(74) *Attorney, Agent, or Firm* — Thomas Horstemeyer, LLP (57) ABSTRACT

Aspects of a method and system for a method and system for a soft output Nordstrom-Robinson (NR) decoder may include one or more processors and/or circuits that are operable to more efficiently compute cross correlation values for a received soft output word based on a NR codebook in comparison to brute force computation approaches. Log likelihood ratios may be computed for each information bit corresponding to the received soft output word by determining corresponding maximum cross correlation values.

24 Claims, 4 Drawing Sheets

METHOD AND SYSTEM FOR A SOFT-OUTPUT NORDSTROM-ROBINSON DECODER

CROSS-REFERENCE TO RELATED APPLICATIONS/INCORPORATION BY REFERENCE

Not Applicable.

FIELD OF THE INVENTION

Certain embodiments of the invention relate to signal processing. More specifically, certain embodiments of the invention relate to a method and system for a soft-output Nordstrom-Robinson decoder.

BACKGROUND OF THE INVENTION

Various standards are utilized for terrestrial digital television (DTV) transmission and reception. For example, in the United States, the DTV standard is specified in the ATSC standard, in Europe the DTV standard is specified in the DVB-T standard, in Japan the DTV standard is specified in the ISDB-T standard and in China the DTV standard is specified in the CDMB-T standard. The CDMB-T standard utilizes a 4QAM-NR constellation mapping. 4QAM-NR constellation mapping is a combination of a 4-level quadrature amplitude modulation (4QAM) with Nordstom-Robinson (NR) coding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a soft-output Nordstrom-Robinson decoder, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a soft output Nordstrom-Robinson (NR) decoder. In various embodiments of the invention, an NR codebook table may be utilized to compute cross correlation values with respect to received soft output words. The cross correlation values may be determined by computing a plurality of partial cross correlation values, wherein each of the plurality of partial cross correlation values is computed based on a subset of the bits in each codeword within the NR codebook table. The cross correlation values may be computed by combining partial cross correlation values computed across distinct bit ranges. Based on the computed cross correlation values a cross correlation vector may be generated.

Based on the generated cross correlation vector, bit log likelihood values (B-LLR) may be computed for each information bit corresponding to the received soft output word. For a given information bit, hypothesis bit values may be determined. The cross correlation vector may be divided into a plurality of cross correlation codeword groups, in which each of the cross correlation codeword groups corresponds to a distinct hypothesis value. A maximum cross correlation value may be determined within each of the cross correlation codeword group. The B-LLR value for the given information bit may be determined based on computed maximum cross correlation values. For a computation of a B-LLR value for a subsequent information bit, a maximum value may be determined for contiguous blocks of cross correlation values in the cross correlation vector. An updated cross correlation vector may be generated, which comprises the maximum cross correlation value selected from each contiguous block. The updated cross correlation vector may be utilized for computing a B-LLR value for the subsequent information bit.

Figure 1:
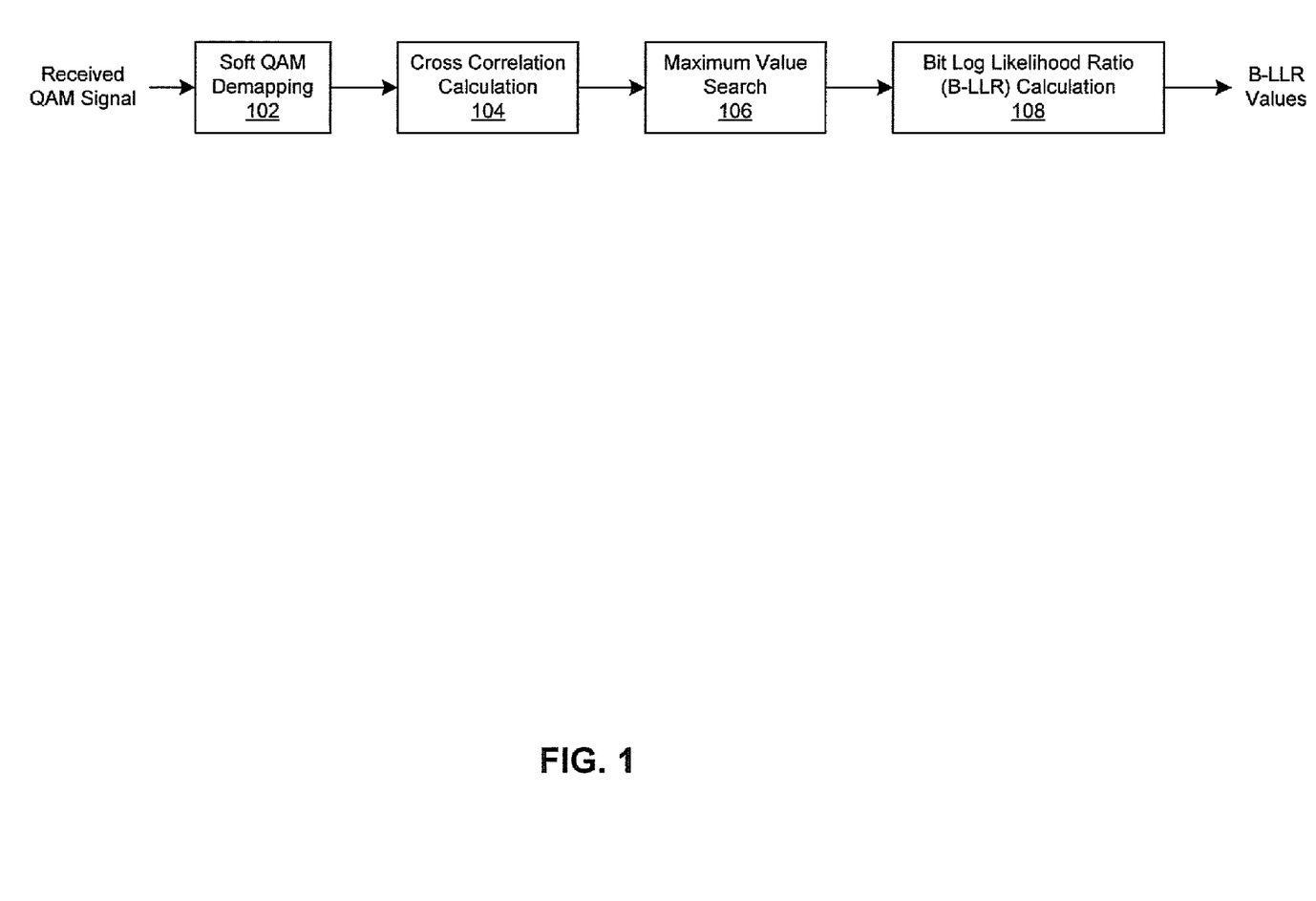
FIG. 1 is an illustration of an exemplary Nordstrom-Robinson soft input soft output decoder system, in accordance with an embodiment.

FIG. 1 is an illustration of an exemplary Nordstrom-Robinson soft input soft output decoder system, in accordance with an embodiment. In an exemplary embodiment of the invention, the NR soft input soft output decoder system may be utilized in an RF receiver. Referring to FIG. 1, there is shown a soft QAM demapping module 102, a cross correlation calculation module 104, a maximum value search module 106 and a bit log-likelihood ratio (B-LLR) calculation module 108.

The QAM demapping module 102 may comprise suitable logic, circuitry, interfaces and/or code that are operable to receive a QAM signal as input. The QAM signal may communicate a plurality of signals, each of which is generated based on a QAM constellation, for example, a 4QAM-NR constellation. In an exemplary embodiment of the invention, the QAM demapping module 102 may receive a plurality of 8 symbols via the received QAM signal. The received symbols may be identified as symbols $s_1$, $s_2$, $s_3$, $s_4$, $s_5$, $s_6$, $s_7$, and $s_8$. The QAM demapping module 102 may generate a 16-value soft output (SO) based on the received symbols $s_1$, $s_2$, $s_3$, $s_4$, $s_5$, $s_6$, $s_7$, and $s_8$. The 16-value SO may be defined as illustrated in the following equation:

$$SO = x_1 x_2 x_3 x_4 x_5 x_6 x_7 x_8 y_1 y_2 y_3 y_4 y_5 y_6 y_7 y_8 \quad [1]$$

where the 8-value tuple, $x_1$, $x_2$, $x_3$, $x_4$, $x_5$, $x_6$, $x_7$, and $x_8$, represents information bits and the 8-value tuple, $y_1$, $y_2$, $y_3$, $y_4$, $y_5$, $y_6$, $y_7$, and $y_8$, represents parity check bits. In an exemplary embodiment of the invention, each of the parity check bits may be generated as a function of one or more information bits and/or other parity check bits as illustrated in the following equations:

$$y_1 = x_8 + x_7 + x_1 + x_2 + x_4 + (x_1 + x_5)*(x_2 + x_3 + x_4 + x_6) + (x_2 + x_3)*(x_4 + x_6) \quad [2a]$$

$$y_2 = x_8 + x_1 + x_2 + x_3 + x_5 + (x_2 + x_6)*(x_3 + x_4 + x_5 + x_7) + (x_3 + x_4)*(x_5 + x_7) \quad [2b]$$

$$y_3 = x_8 + x_2 + x_3 + x_4 + x_6 + (x_3 + x_7)*(x_4 + x_5 + x_6 + x_1) + (x_4 + x_5)*(x_6 + x_1) \quad [2c]$$

$$y_4 = x_8 + x_3 + x_4 + x_5 + x_7 + (x_4 + x_1)*(x_5 + x_6 + x_7 + x_2) + (x_5 + x_6)*(x_7 + x_2) \quad [2d]$$

$$y_5 = x_8 + x_4 + x_5 + x_6 + x_1 + (x_5 + x_2)*(x_6 + x_7 + x_1 + x_3) + (x_6 + x_7)*(x_1 + x_3) \quad [2e]$$

$$y_6 = x_8 + x_5 + x_6 + x_7 + x_2 + (x_6 + x_3)*(x_7 + x_1 + x_2 + x_4) + (x_7 + x_1)*(x_2 + x_4) \quad [2f]$$

$$y_7 = x_8 + x_6 + x_7 + x_1 + x_3 + (x_7 + x_4)*(x_1 + x_2 + x_3 + x_5) + (x_1 + x_2)*(x_3 + x_5) \quad [2g]$$

$$y_8 = x_1 + x_2 + x_3 + x_4 + x_5 + x_6 + x_7 + x_8 + y_1 + y_2 + y_3 + y_4 + y_5 + y_6 \quad [2h]$$

where the symbol "+" refers to a logical exclusive-OR operation and the symbol "*" refers to a logical AND operation.

In an exemplary embodiment of the invention, the QAM demapping module 102 may generate a 16-value SO based on the received symbols, $s_1$, $s_2$, $s_3$, $s_4$, $s_5$, $s_6$, $s_7$, and $s_8$, as illustrated in the following equations:

$$x_1 = s\_in_1 = \text{real}(s_1) \quad [3a]$$
$$x_2 = s\_in_2 = \text{imag}(s_1) \quad [3b]$$
$$x_3 = s\_in_3 = \text{real}(s_2) \quad [3c]$$
$$x_4 = s\_in_4 = \text{imag}(s_2) \quad [3d]$$
$$x_5 = s\_in_5 = \text{real}(s_3) \quad [3e]$$
$$x_6 = s\_in_6 = \text{imag}(s_3) \quad [3f]$$
$$x_7 = s\_in_7 = \text{real}(s_4) \quad [3g]$$
$$x_8 = s\_in_8 = \text{imag}(s_4) \quad [3h]$$
$$x_9 = s\_in_9 = \text{real}(s_5) \quad [3i]$$
$$x_{10} = s\_in_{10} = \text{imag}(s_5) \quad [3j]$$
$$x_{11} = s\_in_{11} = \text{real}(s_6) \quad [3k]$$
$$x_{12} = s\_in_{12} = \text{imag}(s_6) \quad [3l]$$
$$x_{13} = s\_in_{13} = \text{real}(s_7) \quad [3m]$$
$$x_{14} = s\_in_{14} = \text{imag}(s_7) \quad [3n]$$
$$x_{15} = s\_in_{15} = \text{real}(s_8) \quad [3o]$$
$$x_{16} = s\_in_{16} = \text{imag}(s_8) \quad [3p]$$

where real(s) refers to the real part of the complex valued symbol s, and imag(s) refers to the complex part of the complex valued symbol s.

The cross correlation calculation module 104 may comprise suitable logic, circuitry, interfaces and/or code that are operable to generate a cross correlation vector (CCV) based on a SO word and each of plurality of codewords (CW) in a given codebook. The CCV may be generated by computing a cross correlation (CC) value for each CW in the given codebook. A CC value may be computed as illustrated in the following equation:

$$CC(n) = \sum_{i=1}^{16} s\_in_i \times c_i(n) \quad [4]$$

where CC(n) refers to a CC value generated based on the SO word and the $n^{th}$ CW in the codebook, $s\_in_i$ refers to the $i^{th}$ value in the SO word and $c_i(n)$ refers to the $i^{th}$ bit in the $n^{th}$ CW. The $n^{th}$ CW may be represented as CW(n). The CCV for a given SO word may be represented as illustrated in the following equation:

$$CCV = [CC(1), CC(2), CC(3), \ldots, CC(254), CC(255), CC(256)] \quad [5]$$

In an exemplary embodiment of the invention, the codebook may be represented in tabular form as shown in Appendix I. Appendix I is incorporated herein by reference in its entirety. The codebook table presented in Appendix comprises 256 CWs. In the codebook table presented in Appendix I, each row represents a CW(n), wherein the variable n represents a row number in the codebook table and each column $c_i$ represents $c_i(n)$ for values $1 \leq n \leq 256$.

In a brute force cross correlation computation, generation of a CCV, based on the codebook presented in Appendix I, may involve performing 256*15=3,840 summation operations. In various embodiments of the invention, the CCV may be generated by performing 464 summation operations.

In one aspect of an exemplary embodiment of the invention, the number of summation operations may be reduced compared to the brute force approach based on symmetrical properties of the codebook. The symmetrical properties may be represented as illustrated in the following equations:

$$CW(1) = -CW(256)$$
$$CW(2) = -CW(255)$$
$$M$$
$$CW(127) = -CW(130)$$
$$CW(128) = -CW(129) \quad [6]$$

where CW(n) refers to the $n^{th}$ CW in the codebook. Based on the symmetrical property as represented in equation [6], in various embodiments of the invention, CC values may be computed based on two distinct CW sets. A first CW set may comprise CWs CW(1), CW(2), . . . , CW(127) and CW(128). A second CW set may comprise CWs CW(129), CW(130), . . . , CW(255) and CW(256). In various embodiments of the invention, CC values may be computed based on CWs in the first CW set. Accordingly, CC values for the second CW set may be computed by generating a negated CC value computed based on a corresponding CW in the first CW set.

In another aspect of an exemplary embodiment of the invention, the CC value computation as presented in equation [4] may be represented as a plurality of partial CC (PCC) value computations. Each PCC value computation may comprise a distinct subset of the CC value computation presented in equation [4]. Each PCC value may correspond to a distinct CW set. In this regard, a PCC value may be computed once and then utilized for each CC value computation within a given distinct CW set. These PCC values may be represented as PCC(range,set), wherein range refers to the range of bit indexes, i (from equation [4]), which are included in the PCC value computation, and set refers to one or more indexes to CWs within a given CW set. The notation for a given range is represented as [a:b], wherein the index a represents the lowest bit index value in the range and the index b represents the highest bit index value in the range. The notation for a given set is represented as [w:x], where within the tuple w:x, the index w represents the lowest value n (from equation [4]) in a given CW range and the index x represents the highest value n in a given CW range. A set may comprise a plurality of CW ranges and may be represented as [w:x, . . . , y:z], for example.

In an exemplary embodiment of the invention, a plurality of PCC values corresponding to the bit range [1:3] may be represented as illustrated in the following equations:

$$PCC([1:3],[1:32])=-s\_in_1-s\_in_2-s\_in_3 \quad [7a]$$

$$PCC([1:31],[33:64])=-s\_in_1-s\_in_2+s\_in_3 \quad [7b]$$

$$PCC([1:31],[65:96])=-s\_in_1+s\_in_2-s\_in_3 \quad [7c]$$

$$PCC([1:3],[97:128])=-s\_in_1+s\_in_2+s\_in_3 \quad [7d]$$

In an exemplary embodiment of the invention, the plurality of PCC values indicated in equations [7] may be computed with 6 summation operations. A first summation operation may be performed to compute the value $s\_in_2-s\_in_3$ and a second summation operation may be performed to compute the value $s\_in_2+s\_in_3$. Corresponding first and second negation values may be generated from the first and second summation operations to generate the values $-s\_in_2+s\_in_3$ and $-s\_in_2-s\_in_3$ respectively. The PCC value indicated in equation [7a] may be generated by performing a summation operation between the value $-s\_in_1$ and the second negation value. The PCC value indicated in equation [7b] may be generated by performing a summation operation between the value $-s\_in_1$ and the first negation value. The PCC value indicated in equation [7c] may be generated by performing a summation operation between the value $-s\_in_1$ and the result of the first summation operation. The PCC value indicated in equation [7d] may be generated by performing a summation operation between the value $-s\_in_1$ and the result of the second summation operation.

A plurality of PCC values corresponding to the bit range [4:5] may also be represented as illustrated in the following equations:

$$PCC([4:5],[1:8,33:40,65:72,97:104])=-s\_in_4-s\_in_5 \quad [8a]$$

$$PCC([4:5],[9:16,41:48,73:80,105:112])=-s\_in_4+s\_in_5 \quad [8b]$$

$$PCC([4:5],[17:24,49:56,81:88,113:120])=s\_in_4-s\_in_5 \quad [8c]$$

$$PCC([4:5],[25:32,57:64,89:96,121:128])=s\_in_4+s\_in_5 \quad [8d]$$

In an exemplary embodiment of the invention, the plurality of PCC values indicated in equations [8] may be computed with 2 summation operations based on a similar rationale as described above.

By combining the PCC values from equations [7] and [8], a plurality of PCC values corresponding to the bit range [1:5] may be represented as illustrated in the following equations:

$$PCC([1:5],[1:8])=PCC([1:3],[1:32])+PCC([4:5],[1:8,33:40,65:72,97:104]) \quad [9a]$$

$$PCC([1:5],[9:16])=PCC([1:3],[1:32])+PCC([4:5],[9:16,41:48,73:80,105:112]) \quad [9b]$$

$$PCC([1:5],[17:24])=PCC([1:3],[1:32])+PCC([4:5],[17:24,49:56,81:88,113:120]) \quad [9c]$$

$$PCC([1:5],[25:32])=PCC([1:3],[1:32])+PCC([4:5],[25:32,57:64,89:96,121:128]) \quad [9d]$$

$$PCC([1:5],[33:40])=PCC([1:3],[33:64])+PCC([4:5],[1:8,33:40,65:72,97:104]) \quad [9e]$$

$$PCC([1:5],[41:48])=PCC([1:3],[33:64])+PCC([4:5],[9:16,41:48,73:80,105:112]) \quad [9f]$$

$$PCC([1:5],[49:56])=PCC([1:3:33:64])+PCC([4:5],[17:24,49:56,81:88,113:120]) \quad [9g]$$

$$PCC([1:5],[57:64])=PCC([1:3],[33:64])+PCC([4:5],[25:32,57:64,89:96,121:128]) \quad [9h]$$

$$PCC([1:5],[65:72])=PCC([1:3],[65:96])+PCC([4:5],[1:8,33:40,65:72,97:104]) \quad [9i]$$

$$PCC([1:5],[73:80])=PCC([1:3],[65:96])+PCC([4:5],[9:16,41:48,73:80,105:112]) \quad [9j]$$

$$PCC([1:5],[81:88])=PCC([1:3],[65:96])+PCC([4:5],[17:24,49:56,81:88,113:120]) \quad [9k]$$

$$PCC([1:5],[89:96])=PCC([1:3],[65:96])+PCC([4:5],[25:32,57:64,89:96,121:128]) \quad [9l]$$

$$PCC([1:5],[97:104])=PCC([1:3],[97:128])+PCC([4:5],[1:8,33:40,65:72,97:104]) \quad [9m]$$

$$PCC([1:5],[105:112])=PCC([1:3],[97:128])+PCC([4:5],[9:16,41:48,73:80,105:112]) \quad [9n]$$

$$PCC([1:5],[113:120])=PCC([1:3],[97:128])+PCC([4:5],[17:24,49:56,81:88,113:120]) \quad [9o]$$

$$PCC([1:5],[121:128])=PCC([1:3],[97:128])+PCC([4:5],[25:32,57:64,89:96,121:128]) \quad [9p]$$

In an exemplary embodiment of the invention, PCC values for the bit range [1:5] may be computed with 24 summation operations.

A plurality of 32 PCC values corresponding to the bit range [6:10] may also be specified comprising: PCC([6:10],[1:1,25:25,57:57,113:113]), PCC([6:10],[9:9,33:33,49:49,73:73]), PCC([6:10],[17:17,81:81,105:105,121:121]), PCC([6:10],[41:41,65:65,89:89,97:79]), PCC([6:10],[42:42,66:66,90:90,98:98]), PCC([6:10],[18:18,82:82,106:106,122:122]), PCC([6:10],[10:10,34:34,50:50,74:74]), PCC([6:10],[2:2,26:26,58:58,114:114]), PCC([6:10],[43:43,67:67,83:83,107:107]), PCC([6:10],[19:19,91:91,99:99,123:123]), PCC([6:10],[3:3,35:35,59:59,75:75]), PCC([6:10],[11:11,27:27,51:51,115:115]), PCC([6:10],[12:12,28:28,52:52,116:116]), PCC([6:10],[4:4,36:36,60:60,76:76]), PCC([6:10],[20:20,92:92,100:100,124:124]), PCC([6:10],[44:44,68:68,84:84,108:108]), PCC([6:10],[5:5,77:77,109:109,117:117]), PCC([6:10],[61:61,69:69,85:85,125:125]), PCC([6:10],[13:13,29:29,37:37,101:101]), PCC([6:10],[21:21,45:45,53:53,93:93]), PCC([6:10],[22:22,46:46,54:54,94:94]), PCC([6:10],[31:31,39:39,55:55,95:95]), PCC([6:10],[15:15,23:23,47:47,103:103]), PCC([6:10],[63:63,79:79,87:87,119:119]), PCC([6:10],[7:7,71:71,111:111,127:127]), PCC([6:10],[8:8,72:72,112:112,128:128]), PCC([6:10],[64:64,80:80,88:88,120:120]), PCC([6:10],[16:16,24:24,48:48,104:104]) and PCC([6:10],[32:32,40:40,56:56,96:96]). In an exemplary embodiment of the invention, PCC values for the bit range [6:10] may be computed with 60 summation operations based on a rationale that is similar to that described above.

While there are 16 PCC values for the bit range [1:5] and 32 PCC values for the bit range [6:10], in various embodiments of the invention, the number of PCC values computed for the bit range [1:10] is less than 512. In various embodiments of the invention, the number of PCC values computed for the bit range [1:10] is 128. For example, a given PCC value for the bit range [6:10] may be combined with PCC values for the bit range [1:5] when the respective PCC values are computed for the same CW from the CW table. For example, the PCC value PCC([6:10],[1:1,25:25,57:57,113:113]) may be utilized to compute 4 PCC values for the bit range [1:10] as illustrated in the following equations:

PCC([1:10],[1:1])=PCC([1:5],[1:8])+PCC([6:10],[1:1, 25:25,57:57,113:113])

PCC([1:10],[25:25])=PCC([1:5],[25:32])+PCC([6: 10],[1:1,25:25,57:57,113:113])

PCC([1:10],[57:57])=PCC([1:5],[57:64])+PCC([6: 10],[1:1,25:25,57:57,113:113])

PCC([1:10],[113:113])=PCC([1:5],[113:120])+PCC ([6:10],[1:1,25:25,57:57,113:113])  [10]

By computing a PCC for the bit range [1:10] based on each of the 32 PCC values for the bit range [6:10] as illustrated above, in an exemplary embodiment of the invention, 128 PCC values may be computed for the bit range [1:10]. Accordingly, the PCC values for the bit range [1:10] may be generated by performing a total of 24+60+128=212 summation operations.

A plurality of 64 PCC values corresponding to the bit range [11:16] may also be specified comprising: PCC([11:16],[1:1, 48:48]), PCC([11:16],[51:51,106:106]), PCC([11:16],[68: 68,94:94]), PCC([11:16],[15:15,101:101]), PCC([11:16], [91:91,118:118]), PCC([11:16],[29:29,72:72]), PCC([11: 16],[41:41,55:55]), PCC([11:16],[18:18,124:124]), PCC ([11:16],[26:26,116:116]), PCC([11:16],[75:75,85:85]), PCC([11:16],[38:38,127:127]), PCC([11:16],[24:24,57: 57]), PCC([11:16],[7:7,109:109]), PCC([11:16],[34:34,64: 64]), PCC([11:16],[12:12,81:81]), PCC([11:16],[78:78,99: 99]), PCC([11:16],[61:61,87:87]), PCC([11:16],[6:6,28: 28]), PCC([11:16],[50:50,107:107]), PCC([11:16],[89:89, 120:120]), PCC([11:16],[36:36,74:74]), PCC([11:16],[111: 111,113:113]), PCC([11:16],[32:32,69:69]), PCC([11:16], [3:3,46:46]), PCC([11:16],[80:80,97:97]), PCC([11:16],[39: 39,126:126]), PCC([11:16],[13:13,19:19]), PCC([11:16], [44:44,66:66]), PCC([11:16],[22:22,59:59]), PCC([11:16], [9:9,84:84]), PCC([11:16],[104:104,122:122]), PCC([11: 16],[53:53,95:95]), PCC([11:16],[103:103,121:121]), PCC ([11:16],[54:54,96:96]), PCC([11:16],[21:21,60:60]), PCC ([11:16],[10:10,83:83]), PCC([11:16],[14:14,20:20]), PCC ([11:16],[43:43,65:65]), PCC([11:16],[79:79,98:98]), PCC ([11:16],[40:40,125:125]), PCC([11:16],[31:31,70:70]), PCC([11:16],[4:4,45:45]), PCC([11:16],[35:35,73:73]), PCC([11:16],[112:112,114:114]), PCC([11:16],[49:49,108: 108]), PCC([11:16],[90:90,119:119]), PCC([11:16],[62:62, 88:88]), PCC([11:16],[5:5,27:27]), PCC([11:16],[11:11,62: 62]), PCC([11:16],[77:77,100:100]), PCC([11:16],[8:8,110: 110]), PCC([11:16],[33:33,63:63]), PCC([11:16],[37:37, 128:128]), PCC([11:16],[23:23,58:58]), PCC([11:16],[25: 25,115:115]), PCC([11:16],[76:76,86:86]), PCC([11:16], [42:42,56:56]), PCC([11:16],[17:17,123:123]), PCC([11: 16],[92:92,117:117]), PCC([11:16],[30:30,71:71]), PCC ([11:16],[67:67,93:93]), PCC([11:16],[16:16,102:102]), PCC([11:16],[2:2,47:47]) and PCC([11:16],[52:52,105: 105])]). In an exemplary embodiment of the invention, PCC values for the bit range [11:16] may be computed with 124 summation operations based on a rationale that is similar to that described above.

While there are 128 PCC values for the bit range [1:10] and 64 PCC values for the bit range [11:16], in various embodiments of the invention, the number of PCC values computed for the bit range [1:16] is less than 8,192. Following a rationale that is similar to that described above, in various embodiments of the invention, the number of PCC values computed for the bit range [1:16] is 128. In various embodiments of the invention, the CCV (equation [5]), which comprises PCC values for the bit range [1:16], may be generated by performing a total of 24+60+128+124+128=464 summation operations.

In various embodiments of the invention, the CC values within a CCV may be utilized to compute bit log-likelihood ratios (B-LLRs) for each of the information bits corresponding to a 16-value SO. For a given information bit, $s\_in_i$, the CC values in the CCV may be divided into 2 groups; a first group comprises CC values generated based on CWs in which the corresponding bit $c_i=1$ (where $c_i$ refers to an $i^{th}$ bit in the CW), the second group comprises CC values generated based on CWs in which $c_i=-1$.

The maximum value search module 106 may comprise suitable logic, circuitry, interfaces and/or code that are operable to determine maximum CC values. For a given information bit $s\_in_i$, the maximum value search module 106 may determine a maximum CC value in the first CCV group, $max(CCG_1(i))$, and a maximum CC value in the second CCV group, $max(CCG_2(i))$. The first CCV group, $CCG_1$, may comprise 128 CC values from the CCV while the second CCV group, $CCG_2$, may comprise a distinct 128 CC values from the CCV.

Various embodiments of the invention may comprise a method and system for searching for $max(CCG_k(i))$ values (where k is a CCV group index) for each information bit index value i. For information bit $s\_in_8$, (for which i=8), the maximum value search module 106 may determine a $max(CCG_1(8))$ value by performing 127 comparison operations in the first CCV group. The maximum value search module 106 may determine a $max(CCG_2(8))$ value by performing 127 comparison operations in the second CCV group.

Referring to the codebook table in Appendix I, for a given CW index value n (where values of n are determined by the modulus relationship n %2=1), CW bit $c_7(n)=c_7(n+1)$. Since, for i=7, the CC values generated based on adjacent CW pairs may belong to the same CCG, the maximum value search module 106 may perform 128 comparison operations to determine a maximum value between CC(n) and CC(n+1), max(CC(n),CC(n+1)), for each value $1 \leq n \leq 256$.

Based on the maximum value comparisons, max(CC(n), CC(n+1)), for information bit $s\_in_7$, the first CCV group may comprise 64 CC values, while the second CCV group may comprise a distinct 64 CC values. The maximum value search module 106 may determine a $max(CCG_1(7))$ value by performing 63 comparison operations in the first CCV group. The maximum value search module 106 may determine a $max(CCG_2(7))$ value by performing 63 comparison operations in the second CCV group.

Referring to the codebook table in Appendix I, for a given CW index value n (where n %4=1), CW bit $c_6(n)=c_6(n+1)=c_6(n+2)=c_6(n+3)$. Since, for i=6, the CC values generated based on adjacent groups of 4 CWs may belong to the same CCG, the maximum value search module 106 may perform 64 comparison operations between computed maximum values, max(CC(n),CC(n+1)) and max(CC(n+2),CC(n+3)), for each value $1 \leq n \leq 256$, to determine a maximum value between CC(n), CC(n+1), CC(n+2) and CC(n+3), for each value $1 \leq n \leq 256$. The maximum value between CC(n), CC(n+1), CC(n+2) and CC(n+3) may be referred to as a max(CC(n), CC(n+1),CC(n+2),CC(n+3)) value.

Based on the maximum value comparisons, max(CC(n), CC(n+1),CC(n+2),CC(n+3)), for information bit $s\_in_6$, the first CCV group may comprise 32 CC values, while the second CCV group may comprise a distinct 32 CC values. The maximum value search module 106 may determine a max $(CCG_1(6))$ value by performing 31 comparison operations in the first CCV group. The maximum value search module 106 may determine a $max(CCG_2(6))$ value by performing 31 comparison operations in the second CCV group.

Referring to the codebook table in Appendix I, for a given CW index value n (where n %8=1), CW bit $c_5(n)=c_5(n+1)=c_5(n+2)=c_5(n+3)=c_5(n+4)=c_5(n+5)=c_5(n+6)=c_5(n+7)$. Since, for i=5, CC values generated based on adjacent groups of 8 CWs may belong to the same CCG, the maximum value search module 106 may perform 32 comparison operations between computed maximum values, max(CC(n),CC(n+1), CC(n+2),CC(n+3)) and max(CC(n+4),CC(n+5),CC(n+6), CC(n+7)), for each value 1≦n≦256, to determine a maximum value between CC(n), CC(n+1), CC(n+2), CC(n+3), CC(n+4), CC(n+5), CC(n+6) and CC(n+7) for each value 1≦n≦256. The maximum value between CC(n), CC(n+1), CC(n+2), CC(n+3), CC(n+4), CC(n+5), CC(n+6) and CC(n+7) may be referred to as a max(CC(n),CC(n+1), . . . , CC(n+6),CC(n+7)) value.

Based on the maximum value comparisons, max(CC(n), CC(n+1), . . . , CC(n+6),CC(n+7)), for information bit s_in$_5$, the first CCV group may comprise 16 CC values, while the second CCV group may comprise 16 distinct CC values. The maximum value search module 106 may determine a max (CCG$_1$(5)) value by performing 15 comparison operations in the first CCV group. The maximum value search module 106 may determine a max(CCG$_2$(5)) value by performing 15 comparison operations in the second CCV group.

Referring to the codebook table in Appendix I, for a given CW index value n (where n %16=1), CW bit $c_4(n)=c_4(n+1)=c_4(n+2)=\ldots=c_4(n+14)=c_4(n+15)$. Since, for i=4, the CC values generated based on adjacent groups of 16 CWs may belong to the same CCG, the maximum value search module 106 may perform 16 comparison operations between computed maximum values, max(CC(n),CC(n+1), . . . , CC(n+6),CC(n+7)) and max(CC(n+8),CC(n+9), . . . , CC(n+14),CC(n+15)), for each value 1≦n≦256, to determine a maximum value between CC(n), CC(n+1), CC(n+2), . . . , CC(n+14) and CC(n+15) for each value 1≦n≦256. The maximum value between CC(n), CC(n+1), CC(n+2), . . . , CC(n+14) and CC(n+15) may be referred to as a max(CC(n),CC(n+1), . . . , CC(n+14),CC(n+15)) value.

Based on the maximum value comparisons, max(CC(n), CC(n+1), . . . , CC(n+14),CC(n+15)), for information bit s_in$_4$, the first CCV group may comprise 8 CC values, while the second CCV group may comprise a distinct 8 CC values. The maximum value search module 106 may determine a max(CCG$_1$(4)) value by performing 7 comparison operations in the first CCV group. The maximum value search module 106 may determine a max(CCG$_2$(4)) value by performing 7 comparison operations in the second CCV group.

Referring to the codebook table in Appendix I, for a given CW index value n (where n %32=1), CW bit $c_3(n)=c_3(n+1)=c_3(n+2)=\ldots=c_3(n+30)=c_3(n+31)$. Since, for i=3, CC values generated based on adjacent groups of 32 CWs may belong to the same CCG, the maximum value search module 106 may perform 8 comparison operations between computed maximum values, max(CC(n),CC(n+1), . . . , CC(n+14),CC(n+15)) and max(CC(n+16),CC(n+17), . . . , CC(n+30),CC(n+31)), for each value 1≦n≦256, to determine a maximum value between CC(n), CC(n+1), CC(n+2), . . . , CC(n+30) and CC(n+31) for each value 1≦n≦256. The maximum value between CC(n), CC(n+1), CC(n+2), . . . , CC(n+30) and CC(n+31) may be referred to as a max(CC(n),CC(n+1), . . . , CC(n+30),CC(n+31)) value.

Based on the maximum value comparisons, max(CC(n), CC(n+1), . . . , CC(n+30),CC(n+31)), for information bit s_in$_3$, the first CCV group may comprise 4 CC values, while the second CCV group may comprise 4 distinct CC values. The maximum value search module 106 may determine a max(CCG$_1$(3)) value by performing 3 comparison operations in the first CCV group. The maximum value search module 106 may determine a max(CCG$_2$(3)) value by performing 3 comparison operations in the second CCV group.

Referring to the codebook table in Appendix I, for a given CW index value n (where n %64=1), CW bit $c_2(n)=c_2(n+1)=c_2(n+2)=\ldots=c_2(n+62)=c_2(n+63)$. Since, for i=2, CC values generated based on adjacent groups of 64 CWs may belong to the same CCG, the maximum value search module 106 may perform 4 comparison operations between computed maximum values, max(CC(n),CC(n+1), . . . , CC(n+30),CC(n+31)) and max(CC(n+32),CC(n+33), . . . , CC(n+62),CC(n+63)), for each value 1≦n≦256, to determine a maximum value between CC(n), CC(n+1), CC(n+2), . . . , CC(n+62) and CC(n+63) for each value 1≦n≦256. The maximum value between CC(n), CC(n+1), CC(n+2), . . . , CC(n+62) and CC(n+63) may be referred to as a max(CC(n), CC(n+1), . . . , CC(n+62),CC(n+63)) value.

Based on the maximum value comparisons, max(CC(n), CC(n+1), . . . , CC(n+62),CC(n+63)), for information bit s_in$_2$, the first CCV group may comprise 2 CC values, while the second CCV group may comprise a distinct 2 CC values. The maximum value search module 106 may determine a max(CCG$_1$(2)) value by performing 1 comparison operation in the first CCV group. The maximum value search module 106 may determine a max(CCG$_2$(2)) value by performing 1 comparison operation in the second CCV group.

Referring to the codebook table in Appendix I, for a given CW index value n (where n %128=1), CW bit $c_1(n)=c_1(n+1)=c_1(n+2)=\ldots=c_1(n+126)=c_1(n+127)$. Since, for i=1, CC values generated based on adjacent groups of 128 CWs may belong to the same CCG, the maximum value search module 106 may perform 2 comparison operations between computed maximum values, max(CC(n),CC(n+1), . . . , CC(n+62),CC(n+63)) and max(CC(n+64),CC(n+65), . . . , CC(n+126),CC(n+127)), for each value 1≦n≦256, to determine a maximum value between CC(n), CC(n+1), CC(n+2), . . . , CC(n+126) and CC(n+127) for each value 1≦n≦256. The maximum value between CC(n), CC(n+1), CC(n+2), . . . , CC(n+126) and CC(n+127) may be referred to as a max(CC(n),CC(n+1), . . . , CC(n+126),CC(n+127)) value.

Based on the maximum value comparisons, max(CC(n), CC(n+1), . . . , CC(n+126),CC(n+127)), for information bit s_in$_1$, the first CCV group may comprise 1 CC value, while the second CCV group may comprise a distinct 1 CC value. The maximum value search module 106 may determine a max(CCG$_1$(1)) value based on the max(CC(n),CC(n+1), . . . , CC(n+126),CC(n+127)) value for n=1. The maximum value search module 106 may determine a max(CCG$_2$(1)) value based on the max(CC(n),CC(n+1), . . . , CC(n+126),CC(n+127)) for n=129.

In various embodiments of the invention, the maximum value search module 106 may output values max(CCG$_1$(0)) and max(CCG$_2$(i)) for values 1≦i≦8.

The B-LLR calculation module 108 may comprise suitable logic, circuitry and/or code that are operable to compute one or more B-LLR values for each information bit corresponding to a received soft output (SO) value based on received CC values. In various embodiments of the invention, the B-LLR calculation module 108 may compute an LLR value for an i$^{th}$ information bit, LLR(i), as illustrated in the following equation:

$$LLR(i)=\max(CCG_1(i))-\max(CCG_2(i)) \qquad [11]$$

where 1≦i≦8.

Figure 2:
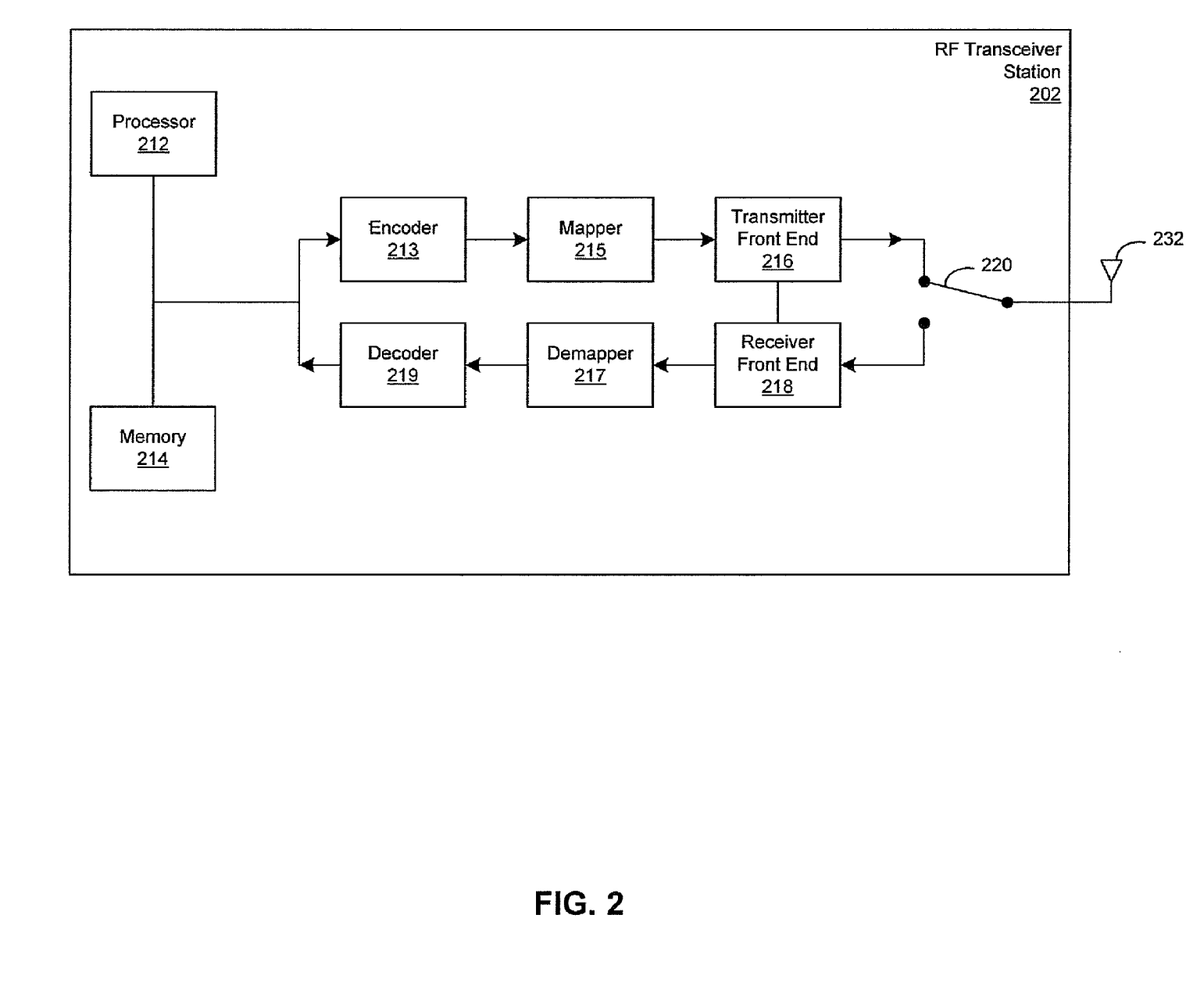
FIG. 2 is an illustration of an exemplary transceiver system, in accordance with an embodiment.

FIG. 2 is an illustration of an exemplary transceiver system, in accordance with an embodiment. Referring to FIG. 2, there is shown an RF transceiver station 202 and an antenna 232.

The RF transceiver station 202 is an exemplary communication device, which may be utilized as a transmitter and/or receiver. The antenna 232 may enable the RF transceiver station 202 to transmit and/or receive signals, for example radio frequency (RF) signals. The RF transceiver station 202 shown in FIG. 2 may also be depicted as comprising one or more transmitting antennas, which are coupled to the transmitter front end (FE) 216 and one or more receiving antennas, which may be coupled to the receiver front end (FE) 218 without loss of generality.

The exemplary RF transceiver station 202 comprises a processor 212, a memory 214, an encoder 213, a decoder 219, a mapper 215 a transmitter FE 216, a demapper 217, a receiver FE 218 and a transmit and receive (T/R) switch 220. The T/R switch 220 may enable the antenna 232 to be communicatively coupled to the transmitter FE 216 or receiver FE 218.

The transmitter FE 216 may comprise suitable logic, circuitry, interfaces and/or code that are operable to generate signals, which may be transmitted via the antenna 232. The encoder 213 may comprise suitable logic, circuitry, interfaces and/or code that are operable to receive data from the processor 212 and/or memory 214 and generate encoded binary data. The encoded binary data may be generated by utilizing NR coding. The mapper 215 may comprise suitable logic, circuitry, interfaces and/or code that are operable to receive encoded binary data from the encoder 213 and convert the encoded binary data to a data symbol representation based on one or more selected modulation types. The mapper 215 may transmit the data symbols to the transmitter FE 216.

The receiver FE 218 may comprise suitable logic, circuitry, interfaces and/or code that are operable to process signals received via the antenna 232. The demapper 217 may comprise suitable logic, circuitry, interfaces and/or code that are operable to receive data symbols from the receiver FE 218 and generate a received QAM signal as shown in FIG. 1, for example. The received QAM signal may be communicated to the decoder 219. The decoder 219 may comprise at least a portion of the cross correlation calculation module 104, the maximum value search module 106 and/or the B-LLR calculation module 108. The decoder 219 may comprise suitable logic, circuitry, interfaces and/or code that are operable to perform subsequent decoding operations on B-LLR values output from the B-LLR calculation module 108. Decoded binary data output from the decoder 219 may be communicated to the processor 212 and/or memory 214.

The memory 214 may comprise suitable logic, circuitry, interfaces and/or code that may enable storage and/or retrieval of data and/or code. The memory 214 may utilize any of a plurality of storage medium technologies, such as volatile memory, for example random access memory (RAM), and/or non-volatile memory, for example electrically erasable programmable read only memory (EEPROM).

In operation, the processor 212 may comprise suitable logic, circuitry, interfaces and/or code that are operable to configure the encoder 212, decoder 219, mapper 215, demapper 217, transmitter FE 216, receiver FE 218, memory 214 and/or T/R switch 220. The memory 214 may be operable to store data for a constellation map, for example a 4QAM constellation map. The mapper 215 and/or demapper 217 may be operable to retrieve stared constellation map data from the memory 214. The mapper 215 and/or demapper 217 may be configured by the processor 212 to utilize a specific constellation map. The processor 212 may be operable to reconfigure the mapper 215 and/or demapper 217 to utilize a subsequent constellation map.

The memory 214 may be operable to store an NR codebook table, such as is presented in Appendix I. The decoder 219 and/or encoder 213 may be operable to retrieve codebook data that are stored in the memory 214. The decoder 219 may be operable to compute CC values, PCC values, CCVs and/or LLR values as illustrated in equations [1]-[11]. The decoder 219 may be operable to store and/or retrieve computed CC values, PCC values, CCVs and/or LLR values in the memory 214.

Figure 3:
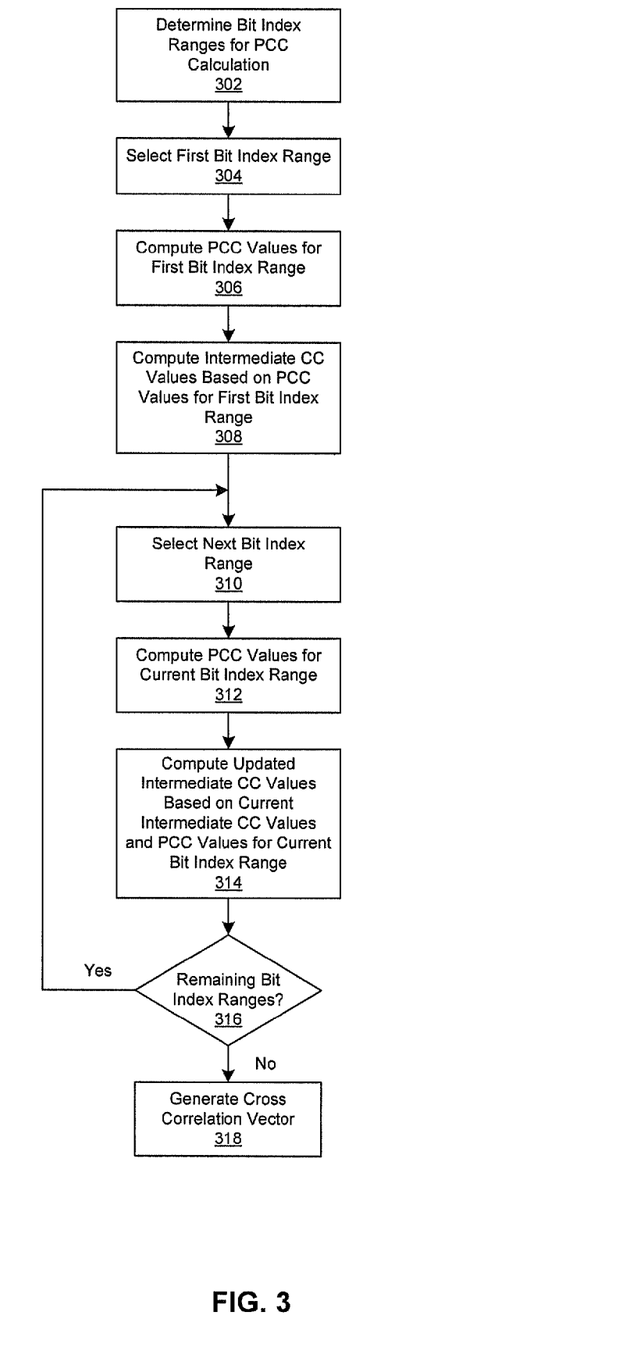
FIG. 3 is a flowchart that illustrates exemplary steps for computing cross correlation values in a soft-output Nordstrom-Robinson decoder, in accordance with an embodiment of the invention.

FIG. 3 is a flowchart that illustrates exemplary steps for computing cross correlation values in a soft-output Nordstrom-Robinson decoder, in accordance with an embodiment of the invention. Referring to FIG. 3, in step 302, the cross correlation module 104 may determine bit index ranges for calculation of partial cross correlation (PCC) values. In an exemplary embodiment of the invention, these bit index ranges may be represented as [1:3,4:5,6:10,11:16]. In step 302, the cross correlation module 104 may select the first bit index range, for example, bit index range [1:3]. In step 306, the cross correlation module 104 may compute PCC values for the first bit index range. In an exemplary embodiment of the invention, these PCC values may be represented as illustrated in equations [7]. In step 308, the cross correlation module 104 may compute intermediate cross correlation (CC) values based on the PCC values for the bit index range [1:3]. In an exemplary embodiment of the invention, the intermediate CC values may be equal to the PCC values as illustrated in equations [7].

In step 310, the cross correlation module 104 may select the next bit index range, for example, bit index range [4:5]. In step 312, the cross correlation module 104 may compute PCC values for the current bit index range. In an exemplary embodiment of the invention, these PCC values may be represented as illustrated in equations [8]. In step 314, the cross correlation module 104 may compute updated intermediate CC values based on the current intermediate CC values and the PCC values for the current bit index range. In an exemplary embodiment of the invention, the updated intermediate CC values may be represented as illustrated in equations [9].

In step 316, the cross correlation module 104 may determine whether there are remaining bit index ranges for which PCC values have yet to be computed. In instances at step 316 where there are remaining bit index values, step 310 may follow step 316. In instances at step 316 where there are not remaining bit index values for which PCC values have yet to be computed, in step 318, the cross correlation module 104 may generate a cross correlation vector (CCV) based on the current intermediate CC values. In an exemplary embodiment of the invention, the CCV may be represented as illustrated in equation [5].

Figure 4:
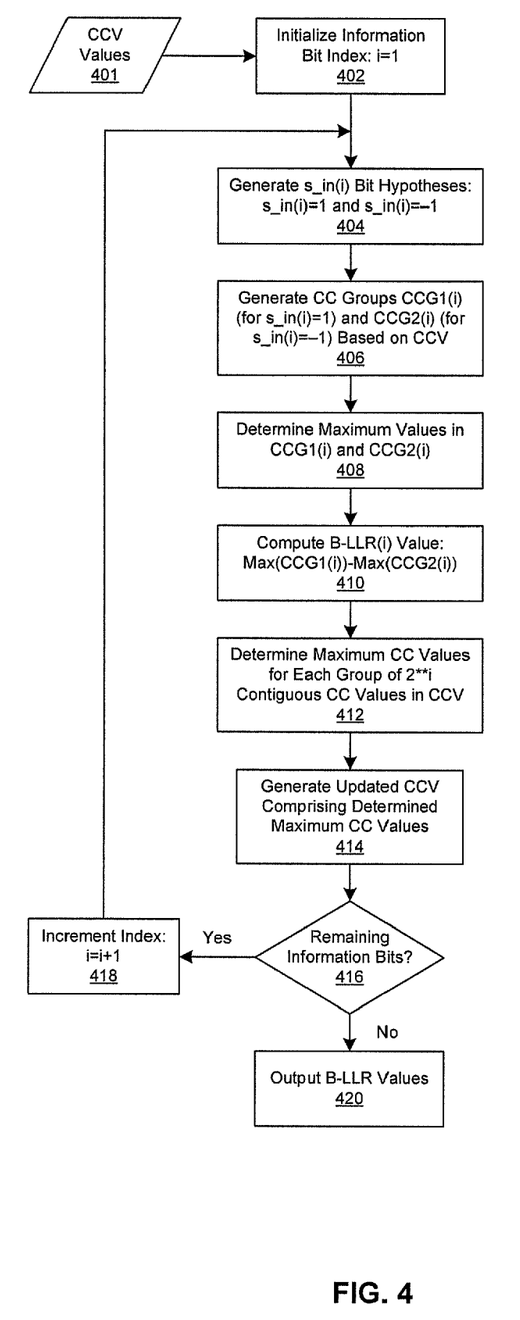
FIG. 4 is a flowchart that illustrates exemplary steps for computing log likelihood values in a soft-output Nordstrom-Robinson decoder, in accordance with an embodiment of the invention.

FIG. 4 is a flowchart that illustrates exemplary steps for computing log likelihood values in a soft-output Nordstrom-Robinson decoder, in accordance with an embodiment of the invention. Referring to FIG. 4, in step 401, the maximum value search module 106 may utilize CCV values as computed by the exemplary procedure as illustrated in FIG. 3. In step 402 the maximum value search module 106 may initialize an information bit index i=1. The information bit index indicates a corresponding information bit corresponding to a soft output (SO) value. In step 404, the maximum value search module 106 may generate bit hypotheses for a current information bit value s_in(i). The hypothesis values may correspond to potential values for corresponding CW bits $c_i$. In an exemplary embodiment of the invention, the bit hypotheses are s_in(i)=1 and s_in(i)=−1. In step 406 the maximum value search module 106 may generate CC groups CCG1($i$) and CCG2($i$) based on the CCV. In an exemplary embodiment of the invention, CC values in CCG1($i$) may correspond to the hypothesis s_in(i)=1 and CC values in CCG2($i$) may correspond to the hypothesis s_in(i)=−1.

In step 408, the maximum value search module 106 may determine maximum CC values in CCG1($i$), max(CCG1($i$)), and CCG2($i$), max(CCG2($i$)), respectively. In step 410, the B-LLR calculation module 108 may compute a B-LLR(i) value based on the values max(CCG1($i$)) and max(CCG2($i$)). In an exemplary embodiment of the invention, the B-LLR computation is illustrated in equation [11]. In step 412, the maximum value search module 106 may determine maximum CC values for each group of $2^i$ contiguous CC values in the CCV. In step 414, the maximum value search module 106 may generate an updated CCV, which comprises the determined maximum CC values determined in step 412. The updated CCV may comprise a plurality of elements that is equal to $\frac{1}{2^i}$ the plurality of elements present in the CCV referred to in step 401.

In step 416, the maximum value search module 106 may be operable to determine whether there are remaining information bits for which B-LLR values are to be computed. In instances at step 416 where there are remaining bits for which B-LLR values are yet to be computed, in step 418, the bit index value may be incremented. Step 404 may follow step 418. In instances at step 416 where there are no remaining bits for which B-LLR values are yet to be computed, in step 420, the B-LLR calculation module 108 may output the computed B-LLR(i) values. The decoder 219 and/or processor 212 may process the output B-LLR(i) values to decoded bit values for each of the information bits s_in$_i$.

Another embodiment of the invention may provide a machine and/or computer readable medium, having stored thereon, a computer program having at least one code section executable by a machine and/or computer, thereby causing the machine and/or computer to perform the steps as described herein for a soft-output Nordstrom-Robinson decoder.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

APPENDIX I

Exemplary Nordstrom-Robinson (NR) Codebook

| CW# | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ |
|---|---|---|---|---|---|---|---|---|---|---|---|---|---|---|---|---|
| 1 | −1 | −1 | −1 | −1 | −1 | −1 | −1 | −1 | −1 | −1 | −1 | −1 | −1 | −1 | −1 | −1 |
| 2 | −1 | −1 | −1 | −1 | −1 | −1 | −1 | 1 | 1 | 1 | 1 | 1 | 1 | 1 | 1 | −1 |
| 3 | −1 | −1 | −1 | −1 | −1 | −1 | 1 | −1 | 1 | −1 | −1 | 1 | −1 | 1 | 1 | 1 |
| 4 | −1 | −1 | −1 | −1 | −1 | −1 | 1 | 1 | −1 | 1 | 1 | −1 | 1 | −1 | −1 | 1 |
| 5 | −1 | −1 | −1 | −1 | −1 | 1 | −1 | −1 | −1 | −1 | 1 | −1 | 1 | 1 | 1 | 1 |
| 6 | −1 | −1 | −1 | −1 | −1 | 1 | −1 | 1 | 1 | 1 | −1 | 1 | −1 | −1 | −1 | 1 |
| 7 | −1 | −1 | −1 | −1 | −1 | 1 | 1 | −1 | 1 | 1 | −1 | −1 | 1 | 1 | −1 | −1 |
| 8 | −1 | −1 | −1 | −1 | −1 | 1 | 1 | 1 | −1 | −1 | 1 | 1 | −1 | −1 | 1 | −1 |
| 9 | −1 | −1 | −1 | −1 | 1 | −1 | −1 | −1 | −1 | 1 | −1 | 1 | 1 | 1 | −1 | 1 |
| 10 | −1 | −1 | −1 | −1 | 1 | −1 | −1 | 1 | 1 | −1 | 1 | −1 | −1 | −1 | 1 | 1 |
| 11 | −1 | −1 | −1 | −1 | 1 | −1 | 1 | −1 | 1 | 1 | 1 | −1 | −1 | −1 | −1 | −1 |
| 12 | −1 | −1 | −1 | −1 | 1 | −1 | 1 | 1 | −1 | −1 | −1 | 1 | 1 | 1 | −1 | −1 |
| 13 | −1 | −1 | −1 | −1 | 1 | 1 | −1 | −1 | 1 | −1 | 1 | 1 | −1 | 1 | −1 | −1 |
| 14 | −1 | −1 | −1 | −1 | 1 | 1 | −1 | 1 | −1 | 1 | −1 | −1 | 1 | −1 | 1 | −1 |
| 15 | −1 | −1 | −1 | −1 | 1 | 1 | 1 | −1 | −1 | −1 | −1 | −1 | −1 | 1 | 1 | 1 |
| 16 | −1 | −1 | −1 | −1 | 1 | 1 | 1 | 1 | 1 | 1 | 1 | 1 | 1 | −1 | 1 | 1 |
| 17 | −1 | −1 | −1 | 1 | −1 | −1 | −1 | −1 | 1 | −1 | 1 | 1 | 1 | −1 | 1 | 1 |
| 18 | −1 | −1 | −1 | 1 | −1 | −1 | −1 | 1 | −1 | 1 | −1 | −1 | −1 | 1 | 1 | 1 |
| 19 | −1 | −1 | −1 | 1 | −1 | −1 | 1 | −1 | −1 | −1 | 1 | 1 | −1 | 1 | −1 | 1 |
| 20 | −1 | −1 | −1 | 1 | −1 | −1 | 1 | 1 | 1 | 1 | −1 | −1 | 1 | −1 | −1 | −1 |
| 21 | −1 | −1 | −1 | 1 | −1 | 1 | −1 | −1 | 1 | 1 | 1 | −1 | −1 | −1 | 1 | −1 |
| 22 | −1 | −1 | −1 | 1 | −1 | 1 | −1 | 1 | −1 | −1 | −1 | 1 | 1 | 1 | −1 | −1 |
| 23 | −1 | −1 | −1 | 1 | −1 | 1 | 1 | −1 | −1 | 1 | 1 | −1 | 1 | −1 | 1 | −1 |
| 24 | −1 | −1 | −1 | 1 | −1 | 1 | 1 | 1 | 1 | −1 | −1 | 1 | −1 | 1 | 1 | 1 |
| 25 | −1 | −1 | −1 | 1 | 1 | −1 | −1 | −1 | −1 | 1 | 1 | −1 | 1 | 1 | 1 | −1 |
| 26 | −1 | −1 | −1 | 1 | 1 | −1 | −1 | 1 | 1 | −1 | −1 | 1 | −1 | 1 | −1 | −1 |
| 27 | −1 | −1 | −1 | 1 | 1 | −1 | 1 | −1 | 1 | −1 | 1 | 1 | 1 | 1 | 1 | 1 |
| 28 | −1 | −1 | −1 | 1 | 1 | −1 | 1 | 1 | −1 | −1 | 1 | −1 | −1 | −1 | −1 | 1 |
| 29 | −1 | −1 | −1 | 1 | 1 | 1 | −1 | −1 | 1 | −1 | −1 | −1 | 1 | −1 | −1 | 1 |
| 30 | −1 | −1 | −1 | 1 | 1 | 1 | −1 | 1 | −1 | 1 | 1 | 1 | −1 | 1 | 1 | 1 |
| 31 | −1 | −1 | −1 | 1 | 1 | 1 | 1 | −1 | −1 | −1 | 1 | −1 | 1 | −1 | 1 | −1 |

APPENDIX I-continued

Exemplary Nordstrom-Robinson (NR) Codebook

| CW# | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ |
|---|---|---|---|---|---|---|---|---|---|---|---|---|---|---|---|---|
| 32 | -1 | -1 | -1 | 1 | 1 | 1 | 1 | 1 | 1 | 1 | -1 | 1 | -1 | 1 | 1 | -1 |
| 33 | -1 | -1 | 1 | -1 | -1 | -1 | -1 | -1 | -1 | 1 | 1 | 1 | -1 | -1 | 1 | -1 |
| 34 | -1 | -1 | 1 | -1 | -1 | -1 | -1 | 1 | 1 | -1 | -1 | -1 | 1 | 1 | -1 | 1 |
| 35 | -1 | -1 | 1 | -1 | -1 | -1 | 1 | -1 | 1 | -1 | 1 | -1 | 1 | -1 | 1 | -1 |
| 36 | -1 | -1 | 1 | -1 | -1 | -1 | 1 | 1 | -1 | 1 | -1 | 1 | 1 | -1 | -1 | 1 |
| 37 | -1 | -1 | 1 | -1 | -1 | 1 | -1 | -1 | 1 | -1 | 1 | 1 | -1 | 1 | -1 | -1 |
| 38 | -1 | -1 | 1 | -1 | -1 | 1 | -1 | 1 | -1 | 1 | -1 | -1 | 1 | -1 | 1 | -1 |
| 39 | -1 | -1 | 1 | -1 | -1 | 1 | 1 | -1 | -1 | -1 | -1 | 1 | 1 | -1 | -1 | 1 |
| 40 | -1 | -1 | 1 | -1 | -1 | 1 | 1 | 1 | 1 | 1 | 1 | -1 | -1 | 1 | 1 | 1 |
| 41 | -1 | -1 | 1 | -1 | 1 | -1 | -1 | -1 | 1 | 1 | -1 | -1 | -1 | 1 | 1 | -1 |
| 42 | -1 | -1 | 1 | -1 | 1 | -1 | -1 | 1 | -1 | -1 | 1 | 1 | 1 | -1 | -1 | -1 |
| 43 | -1 | -1 | 1 | -1 | 1 | -1 | 1 | -1 | -1 | -1 | 1 | -1 | 1 | 1 | -1 | 1 |
| 44 | -1 | -1 | 1 | -1 | 1 | 1 | -1 | 1 | 1 | 1 | 1 | -1 | 1 | -1 | 1 | 1 |
| 45 | -1 | -1 | 1 | -1 | 1 | 1 | -1 | 1 | 1 | 1 | -1 | 1 | 1 | -1 | -1 | 1 |
| 46 | -1 | -1 | 1 | -1 | 1 | 1 | -1 | 1 | -1 | -1 | -1 | 1 | -1 | 1 | 1 | 1 |
| 47 | -1 | -1 | 1 | -1 | 1 | 1 | 1 | -1 | -1 | 1 | 1 | 1 | 1 | 1 | 1 | -1 |
| 48 | -1 | -1 | 1 | -1 | 1 | 1 | 1 | 1 | 1 | -1 | -1 | -1 | -1 | -1 | -1 | 1 |
| 49 | -1 | -1 | 1 | 1 | -1 | -1 | -1 | -1 | 1 | 1 | -1 | 1 | 1 | -1 | 1 | -1 |
| 50 | -1 | -1 | 1 | 1 | -1 | -1 | -1 | 1 | -1 | 1 | 1 | -1 | 1 | -1 | 1 | 1 |
| 51 | -1 | -1 | 1 | 1 | -1 | -1 | 1 | -1 | 1 | -1 | -1 | -1 | -1 | 1 | -1 | 1 |
| 52 | -1 | -1 | 1 | 1 | -1 | -1 | 1 | 1 | -1 | 1 | -1 | 1 | 1 | 1 | 1 | 1 |
| 53 | -1 | -1 | 1 | 1 | -1 | 1 | -1 | -1 | 1 | 1 | 1 | -1 | 1 | 1 | 1 | 1 |
| 54 | -1 | -1 | 1 | 1 | -1 | 1 | -1 | 1 | -1 | -1 | 1 | -1 | -1 | -1 | -1 | 1 |
| 55 | -1 | -1 | 1 | 1 | -1 | 1 | 1 | -1 | -1 | -1 | -1 | -1 | -1 | 1 | 1 | -1 |
| 56 | -1 | -1 | 1 | 1 | -1 | 1 | 1 | 1 | 1 | 1 | 1 | 1 | 1 | -1 | -1 | -1 |
| 57 | -1 | -1 | 1 | 1 | 1 | -1 | -1 | -1 | -1 | -1 | 1 | -1 | -1 | 1 | 1 | 1 |
| 58 | -1 | -1 | 1 | 1 | 1 | -1 | -1 | 1 | 1 | 1 | 1 | 1 | -1 | 1 | -1 | 1 |
| 59 | -1 | -1 | 1 | 1 | -1 | 1 | -1 | 1 | -1 | -1 | 1 | 1 | 1 | -1 | 1 | -1 |
| 60 | -1 | -1 | 1 | 1 | 1 | 1 | -1 | 1 | 1 | 1 | 1 | -1 | -1 | -1 | 1 | 1 |
| 61 | -1 | -1 | 1 | 1 | 1 | 1 | -1 | 1 | 1 | 1 | 1 | -1 | -1 | -1 | -1 | -1 |
| 62 | -1 | -1 | 1 | 1 | 1 | 1 | -1 | 1 | 1 | -1 | 1 | -1 | 1 | 1 | 1 | -1 |
| 63 | -1 | -1 | 1 | 1 | 1 | 1 | 1 | -1 | 1 | -1 | 1 | -1 | -1 | 1 | 1 | 1 |
| 64 | -1 | -1 | 1 | 1 | 1 | 1 | 1 | 1 | -1 | 1 | -1 | 1 | 1 | 1 | -1 | 1 |
| 65 | -1 | 1 | -1 | -1 | -1 | -1 | -1 | -1 | 1 | 1 | 1 | -1 | 1 | -1 | 1 | 1 |
| 66 | -1 | 1 | -1 | -1 | -1 | -1 | -1 | 1 | -1 | -1 | 1 | 1 | 1 | -1 | 1 | 1 |
| 67 | -1 | 1 | -1 | -1 | -1 | -1 | 1 | -1 | -1 | -1 | 1 | 1 | 1 | 1 | -1 | -1 |
| 68 | -1 | 1 | -1 | -1 | -1 | -1 | 1 | 1 | 1 | 1 | -1 | 1 | -1 | -1 | 1 | -1 |
| 69 | -1 | 1 | -1 | -1 | -1 | 1 | -1 | -1 | -1 | 1 | -1 | 1 | -1 | 1 | 1 | 1 |
| 70 | -1 | 1 | -1 | -1 | -1 | 1 | -1 | 1 | 1 | -1 | 1 | -1 | 1 | -1 | -1 | 1 |
| 71 | -1 | 1 | -1 | -1 | -1 | 1 | 1 | -1 | 1 | 1 | 1 | 1 | -1 | 1 | -1 | 1 |
| 72 | -1 | 1 | -1 | -1 | -1 | 1 | 1 | -1 | -1 | -1 | -1 | -1 | 1 | -1 | 1 | 1 |
| 73 | -1 | 1 | -1 | -1 | 1 | -1 | -1 | -1 | -1 | 1 | -1 | 1 | -1 | 1 | 1 | 1 |
| 74 | -1 | 1 | -1 | -1 | 1 | -1 | -1 | 1 | 1 | -1 | 1 | -1 | 1 | -1 | -1 | 1 |
| 75 | -1 | 1 | -1 | -1 | 1 | -1 | 1 | -1 | 1 | -1 | -1 | 1 | -1 | -1 | 1 | 1 |
| 76 | -1 | 1 | -1 | -1 | 1 | -1 | 1 | 1 | -1 | 1 | 1 | 1 | -1 | 1 | 1 | 1 |
| 77 | -1 | 1 | -1 | -1 | 1 | 1 | -1 | -1 | 1 | 1 | 1 | 1 | -1 | -1 | 1 | -1 |
| 78 | -1 | 1 | -1 | -1 | 1 | 1 | 1 | -1 | 1 | 1 | -1 | -1 | 1 | 1 | 1 | 1 |
| 79 | -1 | 1 | -1 | -1 | 1 | 1 | 1 | -1 | 1 | -1 | 1 | -1 | -1 | 1 | 1 | -1 |
| 80 | -1 | 1 | -1 | -1 | 1 | 1 | 1 | -1 | 1 | -1 | 1 | 1 | -1 | -1 | -1 | -1 |
| 81 | -1 | 1 | -1 | 1 | -1 | -1 | -1 | -1 | 1 | -1 | 1 | 1 | 1 | 1 | 1 | -1 |
| 82 | -1 | 1 | -1 | 1 | -1 | -1 | -1 | 1 | -1 | 1 | 1 | 1 | -1 | -1 | -1 | 1 |
| 83 | -1 | 1 | -1 | 1 | -1 | 1 | -1 | -1 | -1 | -1 | -1 | -1 | -1 | 1 | 1 | 1 |
| 84 | -1 | 1 | -1 | 1 | -1 | -1 | 1 | 1 | 1 | -1 | 1 | 1 | 1 | -1 | 1 | 1 |
| 85 | -1 | 1 | -1 | 1 | -1 | 1 | -1 | -1 | 1 | -1 | 1 | -1 | 1 | -1 | 1 | 1 |
| 86 | -1 | 1 | -1 | 1 | -1 | 1 | -1 | 1 | -1 | 1 | -1 | 1 | 1 | -1 | 1 | 1 |
| 87 | -1 | 1 | -1 | 1 | -1 | 1 | 1 | -1 | 1 | -1 | 1 | -1 | -1 | -1 | -1 | -1 |
| 88 | -1 | 1 | -1 | 1 | -1 | 1 | 1 | 1 | -1 | 1 | -1 | 1 | 1 | 1 | 1 | 1 |
| 89 | -1 | 1 | -1 | 1 | 1 | -1 | -1 | -1 | 1 | -1 | 1 | -1 | 1 | -1 | 1 | 1 |
| 90 | -1 | 1 | -1 | 1 | 1 | -1 | -1 | 1 | -1 | 1 | -1 | 1 | 1 | 1 | -1 | 1 |
| 91 | -1 | 1 | -1 | 1 | 1 | -1 | 1 | -1 | 1 | -1 | -1 | -1 | -1 | -1 | -1 | -1 |
| 92 | -1 | 1 | -1 | 1 | 1 | -1 | 1 | 1 | -1 | 1 | 1 | 1 | 1 | -1 | -1 | 1 |
| 93 | -1 | 1 | -1 | 1 | 1 | 1 | -1 | -1 | 1 | 1 | 1 | 1 | 1 | -1 | 1 | 1 |
| 94 | -1 | 1 | -1 | 1 | 1 | 1 | -1 | -1 | -1 | 1 | 1 | -1 | 1 | 1 | 1 | 1 |
| 95 | -1 | 1 | -1 | 1 | 1 | 1 | -1 | -1 | -1 | 1 | 1 | 1 | 1 | 1 | 1 | 1 |
| 96 | -1 | 1 | -1 | 1 | 1 | 1 | 1 | 1 | 1 | -1 | -1 | -1 | -1 | -1 | 1 | 1 |
| 97 | -1 | 1 | 1 | -1 | -1 | -1 | -1 | -1 | 1 | -1 | 1 | 1 | -1 | 1 | -1 | -1 |
| 98 | -1 | 1 | 1 | -1 | -1 | -1 | -1 | 1 | -1 | -1 | -1 | 1 | -1 | 1 | 1 | 1 |
| 99 | -1 | 1 | 1 | -1 | -1 | -1 | 1 | -1 | -1 | -1 | 1 | -1 | 1 | 1 | 1 | 1 |
| 100 | -1 | 1 | 1 | -1 | -1 | -1 | 1 | -1 | 1 | -1 | 1 | -1 | 1 | -1 | 1 | 1 |
| 101 | -1 | 1 | 1 | -1 | -1 | 1 | -1 | 1 | -1 | -1 | -1 | -1 | -1 | -1 | 1 | 1 |
| 102 | -1 | 1 | 1 | -1 | -1 | 1 | -1 | 1 | -1 | 1 | 1 | 1 | 1 | -1 | 1 | 1 |
| 103 | -1 | 1 | 1 | -1 | -1 | 1 | 1 | -1 | -1 | -1 | 1 | 1 | -1 | -1 | 1 | 1 |
| 104 | -1 | 1 | 1 | -1 | -1 | 1 | 1 | 1 | -1 | 1 | -1 | 1 | 1 | 1 | -1 | 1 |
| 105 | -1 | 1 | 1 | -1 | 1 | -1 | -1 | -1 | -1 | 1 | 1 | 1 | 1 | 1 | 1 | 1 |
| 106 | -1 | 1 | 1 | -1 | 1 | -1 | -1 | 1 | -1 | 1 | -1 | -1 | -1 | -1 | 1 | 1 |
| 107 | -1 | 1 | 1 | -1 | 1 | -1 | 1 | -1 | -1 | -1 | -1 | 1 | -1 | -1 | 1 | -1 |

APPENDIX I-continued

Exemplary Nordstrom-Robinson (NR) Codebook

| CW# | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ |
|---|---|---|---|---|---|---|---|---|---|---|---|---|---|---|---|---|
| 108 | -1 | 1 | 1 | -1 | 1 | -1 | 1 | 1 | 1 | 1 | 1 | -1 | 1 | 1 | -1 | -1 |
| 109 | -1 | 1 | 1 | -1 | 1 | 1 | -1 | -1 | -1 | -1 | -1 | -1 | 1 | 1 | -1 | -1 |
| 110 | -1 | 1 | 1 | -1 | 1 | 1 | -1 | 1 | 1 | 1 | 1 | 1 | -1 | -1 | 1 | -1 |
| 111 | -1 | 1 | 1 | -1 | 1 | 1 | 1 | -1 | 1 | 1 | -1 | 1 | -1 | 1 | -1 | 1 |
| 112 | -1 | 1 | 1 | -1 | 1 | 1 | 1 | 1 | -1 | -1 | 1 | -1 | 1 | -1 | 1 | 1 |
| 113 | -1 | 1 | 1 | 1 | -1 | -1 | -1 | -1 | -1 | -1 | -1 | 1 | -1 | 1 | -1 | 1 |
| 114 | -1 | 1 | 1 | 1 | -1 | -1 | -1 | 1 | 1 | 1 | 1 | -1 | 1 | -1 | 1 | 1 |
| 115 | -1 | 1 | 1 | 1 | -1 | 1 | -1 | 1 | 1 | 1 | 1 | -1 | 1 | 1 | -1 |
| 116 | -1 | 1 | 1 | 1 | -1 | -1 | 1 | -1 | -1 | -1 | -1 | 1 | -1 | -1 | -1 | -1 |
| 117 | -1 | 1 | 1 | 1 | -1 | 1 | -1 | -1 | -1 | 1 | 1 | 1 | -1 | 1 | 1 |
| 118 | -1 | 1 | 1 | 1 | -1 | 1 | -1 | 1 | 1 | -1 | -1 | 1 | -1 | 1 | -1 | -1 |
| 119 | -1 | 1 | 1 | 1 | -1 | 1 | 1 | -1 | 1 | -1 | 1 | 1 | 1 | -1 | 1 |
| 120 | -1 | 1 | 1 | 1 | -1 | 1 | 1 | 1 | -1 | 1 | -1 | 1 | -1 | 1 | -1 | -1 |
| 121 | -1 | 1 | 1 | 1 | 1 | -1 | -1 | -1 | 1 | -1 | 1 | -1 | 1 | -1 | -1 | -1 |
| 122 | -1 | 1 | 1 | 1 | 1 | -1 | -1 | 1 | -1 | 1 | -1 | 1 | 1 | 1 | -1 |
| 123 | -1 | 1 | 1 | 1 | 1 | -1 | 1 | -1 | 1 | 1 | 1 | 1 | -1 | -1 | 1 |
| 124 | -1 | 1 | 1 | 1 | -1 | 1 | 1 | 1 | -1 | -1 | -1 | 1 | 1 | 1 |
| 125 | -1 | 1 | 1 | 1 | 1 | -1 | -1 | 1 | 1 | -1 | -1 | 1 | 1 | 1 |
| 126 | -1 | 1 | 1 | 1 | 1 | -1 | 1 | 1 | -1 | 1 | 1 | -1 | -1 | 1 |
| 127 | -1 | 1 | 1 | 1 | 1 | 1 | -1 | 1 | 1 | -1 | -1 | 1 | -1 | 1 | -1 |
| 128 | -1 | 1 | 1 | 1 | 1 | 1 | 1 | -1 | 1 | 1 | 1 | -1 | 1 | -1 | 1 |
| 129 | 1 | -1 | -1 | -1 | -1 | -1 | -1 | 1 | 1 | -1 | 1 | 1 | -1 | 1 | 1 |
| 130 | 1 | -1 | -1 | -1 | -1 | -1 | -1 | 1 | -1 | -1 | 1 | 1 | -1 | 1 | -1 | 1 |
| 131 | 1 | -1 | -1 | -1 | -1 | -1 | 1 | -1 | -1 | 1 | -1 | -1 | 1 | 1 | 1 | -1 |
| 132 | 1 | -1 | -1 | -1 | -1 | -1 | 1 | 1 | 1 | 1 | -1 | 1 | -1 | 1 | -1 | -1 |
| 133 | 1 | -1 | -1 | -1 | -1 | 1 | -1 | -1 | -1 | 1 | 1 | 1 | 1 | -1 | -1 | 1 |
| 134 | 1 | -1 | -1 | -1 | 1 | -1 | 1 | 1 | -1 | -1 | -1 | -1 | 1 | 1 | 1 |
| 135 | 1 | -1 | -1 | -1 | 1 | 1 | -1 | 1 | -1 | 1 | -1 | -1 | -1 | -1 | 1 |
| 136 | 1 | -1 | -1 | -1 | 1 | 1 | 1 | 1 | -1 | 1 | 1 | -1 | 1 | 1 | 1 |
| 137 | 1 | -1 | -1 | -1 | 1 | -1 | -1 | 1 | -1 | 1 | -1 | 1 | 1 | -1 | 1 |
| 138 | 1 | -1 | -1 | -1 | 1 | -1 | 1 | -1 | 1 | -1 | 1 | -1 | -1 | 1 | -1 |
| 139 | 1 | -1 | -1 | -1 | 1 | -1 | 1 | -1 | 1 | 1 | 1 | 1 | -1 | 1 | 1 |
| 140 | 1 | -1 | -1 | -1 | 1 | -1 | 1 | 1 | 1 | 1 | -1 | -1 | -1 | 1 | -1 | 1 |
| 141 | 1 | -1 | -1 | -1 | 1 | 1 | -1 | 1 | 1 | 1 | 1 | -1 | 1 | 1 | 1 |
| 142 | 1 | -1 | -1 | -1 | 1 | 1 | -1 | 1 | -1 | -1 | -1 | -1 | 1 | -1 | 1 |
| 143 | 1 | -1 | -1 | -1 | 1 | 1 | 1 | -1 | -1 | -1 | 1 | -1 | 1 | -1 | -1 |
| 144 | 1 | -1 | -1 | -1 | 1 | 1 | 1 | 1 | 1 | 1 | -1 | 1 | -1 | 1 | -1 |
| 145 | 1 | -1 | -1 | 1 | -1 | -1 | -1 | 1 | 1 | -1 | 1 | -1 | 1 | -1 | 1 | -1 |
| 146 | 1 | -1 | -1 | 1 | -1 | -1 | 1 | -1 | 1 | -1 | -1 | 1 | -1 | 1 | -1 |
| 147 | 1 | -1 | -1 | 1 | -1 | 1 | -1 | 1 | -1 | -1 | -1 | 1 | 1 | -1 | 1 |
| 148 | 1 | -1 | -1 | 1 | -1 | 1 | 1 | 1 | 1 | 1 | -1 | -1 | 1 | 1 |
| 149 | 1 | -1 | -1 | 1 | -1 | 1 | -1 | -1 | -1 | -1 | 1 | -1 | 1 | -1 | 1 |
| 150 | 1 | -1 | -1 | 1 | -1 | 1 | -1 | 1 | 1 | -1 | 1 | 1 | 1 | -1 | 1 |
| 151 | 1 | -1 | -1 | 1 | -1 | 1 | 1 | -1 | 1 | -1 | 1 | 1 | 1 | 1 | 1 | -1 |
| 152 | 1 | -1 | -1 | 1 | -1 | 1 | 1 | 1 | -1 | 1 | -1 | -1 | -1 | -1 | -1 |
| 153 | 1 | -1 | -1 | 1 | 1 | -1 | -1 | -1 | 1 | -1 | -1 | 1 | -1 | -1 | -1 | 1 |
| 154 | 1 | -1 | -1 | 1 | 1 | -1 | -1 | 1 | -1 | 1 | -1 | 1 | 1 | 1 | 1 |
| 155 | 1 | -1 | -1 | 1 | 1 | -1 | 1 | 1 | -1 | -1 | -1 | 1 | 1 | -1 |
| 156 | 1 | -1 | -1 | 1 | 1 | -1 | 1 | -1 | 1 | 1 | 1 | 1 | 1 | -1 | -1 |
| 157 | 1 | -1 | -1 | 1 | 1 | 1 | -1 | -1 | -1 | 1 | 1 | 1 | 1 | 1 | 1 |
| 158 | 1 | -1 | -1 | 1 | 1 | 1 | -1 | 1 | -1 | 1 | 1 | -1 | -1 | -1 | 1 |
| 159 | 1 | -1 | -1 | 1 | 1 | 1 | 1 | -1 | 1 | 1 | 1 | -1 | -1 | 1 | 1 |
| 160 | 1 | -1 | -1 | 1 | 1 | 1 | 1 | 1 | -1 | -1 | 1 | -1 | -1 | 1 | 1 |
| 161 | 1 | -1 | 1 | -1 | -1 | -1 | -1 | -1 | -1 | -1 | 1 | 1 | 1 | 1 | -1 |
| 162 | 1 | -1 | 1 | -1 | -1 | -1 | 1 | 1 | 1 | 1 | -1 | 1 | 1 | -1 | -1 |
| 163 | 1 | -1 | 1 | -1 | -1 | -1 | 1 | -1 | 1 | 1 | 1 | 1 | 1 | -1 | 1 | -1 |
| 164 | 1 | -1 | 1 | -1 | -1 | 1 | 1 | -1 | -1 | -1 | -1 | -1 | 1 | 1 |
| 165 | 1 | -1 | 1 | -1 | -1 | 1 | -1 | -1 | 1 | -1 | -1 | -1 | 1 | -1 | 1 |
| 166 | 1 | -1 | 1 | -1 | -1 | 1 | -1 | 1 | -1 | 1 | 1 | 1 | 1 | -1 | 1 | 1 |
| 167 | 1 | -1 | 1 | -1 | 1 | -1 | -1 | -1 | 1 | 1 | 1 | -1 | 1 | 1 | -1 |
| 168 | 1 | -1 | 1 | -1 | -1 | 1 | 1 | 1 | -1 | -1 | 1 | 1 | 1 | -1 | -1 |
| 169 | 1 | -1 | 1 | -1 | -1 | -1 | -1 | 1 | -1 | -1 | 1 | -1 | -1 | 1 |
| 170 | 1 | -1 | 1 | -1 | -1 | -1 | 1 | -1 | 1 | -1 | 1 | 1 | 1 | 1 |
| 171 | 1 | -1 | 1 | -1 | 1 | 1 | -1 | 1 | -1 | 1 | -1 | 1 | -1 | -1 | -1 |
| 172 | 1 | -1 | 1 | -1 | 1 | -1 | 1 | -1 | 1 | -1 | 1 | -1 | 1 | 1 | -1 |
| 173 | 1 | -1 | 1 | -1 | 1 | 1 | -1 | -1 | -1 | 1 | -1 | -1 | -1 | 1 | -1 |
| 174 | 1 | -1 | 1 | -1 | 1 | 1 | -1 | 1 | 1 | 1 | 1 | -1 | 1 | 1 | -1 | 1 |
| 175 | 1 | -1 | 1 | -1 | 1 | 1 | 1 | -1 | 1 | -1 | -1 | 1 | 1 | -1 | 1 |
| 176 | 1 | -1 | 1 | -1 | 1 | 1 | 1 | -1 | 1 | 1 | -1 | -1 | -1 | 1 |
| 177 | 1 | -1 | 1 | 1 | -1 | -1 | -1 | -1 | 1 | -1 | 1 | -1 | 1 | 1 | 1 |
| 178 | 1 | -1 | 1 | 1 | -1 | -1 | -1 | 1 | 1 | 1 | -1 | 1 | -1 | 1 | 1 |
| 179 | 1 | -1 | 1 | 1 | -1 | -1 | 1 | -1 | -1 | 1 | 1 | -1 | -1 | -1 | -1 |
| 180 | 1 | -1 | 1 | 1 | -1 | -1 | 1 | 1 | 1 | -1 | -1 | 1 | -1 | 1 | 1 | -1 |
| 181 | 1 | -1 | 1 | 1 | -1 | 1 | -1 | -1 | -1 | -1 | -1 | 1 | -1 | 1 | -1 | -1 |
| 182 | 1 | -1 | 1 | 1 | -1 | 1 | -1 | 1 | -1 | 1 | 1 | -1 | 1 | 1 | -1 |
| 183 | 1 | -1 | 1 | 1 | -1 | 1 | 1 | -1 | -1 | 1 | 1 | -1 | 1 | -1 | 1 | 1 |

APPENDIX I-continued

Exemplary Nordstrom-Robinson (NR) Codebook

| CW# | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ |
|---|---|---|---|---|---|---|---|---|---|---|---|---|---|---|---|---|
| 184 | 1 | −1 | 1 | 1 | −1 | 1 | 1 | 1 | 1 | −1 | −1 | 1 | −1 | 1 | −1 | 1 |
| 185 | 1 | −1 | 1 | 1 | 1 | −1 | −1 | −1 | 1 | 1 | 1 | 1 | 1 | −1 | 1 | −1 |
| 186 | 1 | −1 | 1 | 1 | 1 | −1 | −1 | 1 | −1 | −1 | −1 | −1 | −1 | 1 | −1 | −1 |
| 187 | 1 | −1 | 1 | 1 | 1 | −1 | 1 | −1 | 1 | −1 | 1 | −1 | 1 | 1 | 1 | 1 |
| 188 | 1 | −1 | 1 | 1 | 1 | −1 | 1 | 1 | 1 | −1 | 1 | −1 | 1 | −1 | 1 | 1 |
| 189 | 1 | −1 | 1 | 1 | 1 | 1 | −1 | −1 | −1 | 1 | 1 | 1 | 1 | −1 | 1 | 1 |
| 190 | 1 | −1 | 1 | 1 | 1 | 1 | −1 | 1 | 1 | 1 | −1 | −1 | −1 | 1 | 1 | 1 |
| 191 | 1 | −1 | 1 | 1 | 1 | 1 | 1 | −1 | 1 | 1 | 1 | −1 | 1 | −1 | 1 | −1 |
| 192 | 1 | −1 | 1 | 1 | 1 | 1 | 1 | 1 | −1 | −1 | 1 | 1 | −1 | 1 | 1 | 1 |
| 193 | 1 | 1 | −1 | −1 | −1 | −1 | −1 | −1 | 1 | −1 | 1 | 1 | −1 | −1 | 1 | −1 |
| 194 | 1 | 1 | −1 | −1 | −1 | −1 | −1 | 1 | −1 | 1 | −1 | −1 | 1 | 1 | −1 | −1 |
| 195 | 1 | 1 | −1 | −1 | −1 | −1 | 1 | −1 | 1 | −1 | 1 | −1 | −1 | −1 | 1 |
| 196 | 1 | 1 | −1 | −1 | −1 | −1 | 1 | 1 | −1 | 1 | 1 | −1 | 1 | 1 | 1 | 1 |
| 197 | 1 | 1 | −1 | −1 | −1 | 1 | −1 | −1 | 1 | −1 | −1 | 1 | 1 | 1 | −1 | 1 |
| 198 | 1 | 1 | −1 | −1 | −1 | 1 | −1 | 1 | −1 | 1 | 1 | −1 | −1 | −1 | 1 | 1 |
| 199 | 1 | 1 | −1 | −1 | −1 | 1 | 1 | −1 | −1 | −1 | −1 | 1 | −1 | 1 | 1 | −1 |
| 200 | 1 | 1 | −1 | −1 | −1 | 1 | 1 | 1 | 1 | 1 | 1 | 1 | 1 | −1 | 1 | 1 |
| 201 | 1 | 1 | −1 | −1 | 1 | −1 | −1 | −1 | −1 | 1 | −1 | −1 | 1 | 1 | 1 |
| 202 | 1 | 1 | −1 | −1 | 1 | −1 | −1 | 1 | 1 | 1 | 1 | 1 | −1 | −1 | 1 | −1 |
| 203 | 1 | 1 | −1 | −1 | 1 | −1 | 1 | −1 | 1 | −1 | 1 | 1 | 1 | 1 | 1 | −1 |
| 204 | 1 | 1 | −1 | −1 | 1 | −1 | 1 | 1 | −1 | 1 | −1 | 1 | −1 | −1 | −1 | 1 |
| 205 | 1 | 1 | −1 | −1 | 1 | 1 | −1 | −1 | 1 | 1 | −1 | 1 | −1 | −1 | −1 | −1 |
| 206 | 1 | 1 | −1 | −1 | 1 | 1 | −1 | 1 | −1 | −1 | 1 | 1 | 1 | 1 | 1 | −1 |
| 207 | 1 | 1 | −1 | −1 | 1 | 1 | 1 | −1 | −1 | 1 | −1 | 1 | 1 | 1 | −1 | 1 |
| 208 | 1 | 1 | −1 | −1 | 1 | 1 | 1 | 1 | 1 | −1 | 1 | −1 | −1 | −1 | 1 | 1 |
| 209 | 1 | 1 | −1 | 1 | −1 | −1 | −1 | −1 | 1 | 1 | 1 | 1 | 1 | 1 | 1 | 1 |
| 210 | 1 | 1 | −1 | 1 | −1 | −1 | −1 | 1 | 1 | −1 | −1 | −1 | −1 | −1 | −1 | 1 |
| 211 | 1 | 1 | −1 | 1 | −1 | −1 | 1 | −1 | 1 | 1 | 1 | −1 | 1 | −1 | −1 | −1 |
| 212 | 1 | 1 | −1 | 1 | −1 | −1 | 1 | 1 | −1 | 1 | −1 | 1 | −1 | 1 | 1 | 1 |
| 213 | 1 | 1 | −1 | 1 | −1 | 1 | −1 | −1 | −1 | 1 | −1 | 1 | −1 | 1 | −1 | 1 |
| 214 | 1 | 1 | −1 | 1 | −1 | 1 | −1 | 1 | 1 | −1 | 1 | 1 | −1 | 1 | 1 | 1 |
| 215 | 1 | 1 | −1 | 1 | −1 | 1 | 1 | −1 | 1 | −1 | −1 | −1 | 1 | 1 | 1 | 1 |
| 216 | 1 | 1 | −1 | 1 | −1 | 1 | 1 | 1 | −1 | −1 | 1 | 1 | 1 | −1 | 1 | 1 |
| 217 | 1 | 1 | −1 | 1 | 1 | −1 | −1 | −1 | −1 | −1 | 1 | 1 | 1 | −1 | 1 | −1 |
| 218 | 1 | 1 | −1 | 1 | 1 | −1 | −1 | 1 | 1 | 1 | −1 | −1 | 1 | 1 | −1 |
| 219 | 1 | 1 | −1 | 1 | 1 | −1 | 1 | −1 | 1 | −1 | 1 | 1 | −1 | 1 | −1 | 1 |
| 220 | 1 | 1 | −1 | 1 | 1 | −1 | 1 | 1 | −1 | 1 | −1 | 1 | 1 | −1 | 1 | 1 |
| 221 | 1 | 1 | −1 | 1 | 1 | 1 | −1 | −1 | 1 | 1 | −1 | 1 | −1 | 1 | 1 | 1 |
| 222 | 1 | 1 | −1 | 1 | 1 | 1 | −1 | 1 | −1 | 1 | −1 | 1 | −1 | 1 | −1 |
| 223 | 1 | 1 | −1 | 1 | 1 | 1 | 1 | −1 | 1 | 1 | 1 | −1 | −1 | 1 | 1 | −1 |
| 224 | 1 | 1 | −1 | 1 | 1 | 1 | 1 | 1 | −1 | −1 | −1 | 1 | 1 | −1 | 1 |
| 225 | 1 | 1 | 1 | −1 | −1 | −1 | −1 | −1 | 1 | −1 | 1 | 1 | −1 | 1 | 1 |
| 226 | 1 | 1 | 1 | −1 | −1 | −1 | −1 | 1 | 1 | 1 | −1 | 1 | −1 | 1 | 1 | 1 |
| 227 | 1 | 1 | 1 | −1 | −1 | −1 | 1 | −1 | 1 | −1 | −1 | −1 | 1 | −1 | −1 |
| 228 | 1 | 1 | 1 | −1 | −1 | −1 | 1 | 1 | −1 | 1 | 1 | 1 | 1 | −1 | 1 | −1 |
| 229 | 1 | 1 | 1 | −1 | −1 | 1 | −1 | −1 | 1 | 1 | −1 | 1 | 1 | 1 | −1 |
| 230 | 1 | 1 | 1 | −1 | −1 | 1 | −1 | 1 | −1 | −1 | −1 | 1 | −1 | −1 | −1 | 1 |
| 231 | 1 | 1 | 1 | −1 | −1 | 1 | 1 | −1 | −1 | 1 | 1 | 1 | −1 | 1 | 1 | 1 |
| 232 | 1 | 1 | 1 | −1 | −1 | 1 | 1 | 1 | 1 | 1 | −1 | −1 | 1 | −1 | −1 | 1 |
| 233 | 1 | 1 | 1 | −1 | 1 | −1 | −1 | −1 | −1 | 1 | 1 | −1 | 1 | −1 | −1 |
| 234 | 1 | 1 | 1 | −1 | 1 | −1 | −1 | 1 | 1 | −1 | −1 | 1 | −1 | 1 | −1 |
| 235 | 1 | 1 | 1 | −1 | 1 | −1 | 1 | −1 | 1 | 1 | −1 | 1 | −1 | 1 | 1 | 1 |
| 236 | 1 | 1 | 1 | −1 | 1 | −1 | 1 | 1 | −1 | 1 | 1 | 1 | 1 | 1 | −1 | 1 |
| 237 | 1 | 1 | 1 | −1 | 1 | 1 | −1 | −1 | −1 | 1 | 1 | −1 | 1 | 1 | 1 |
| 238 | 1 | 1 | 1 | −1 | 1 | 1 | −1 | 1 | 1 | −1 | −1 | −1 | 1 | −1 | −1 |
| 239 | 1 | 1 | 1 | −1 | 1 | 1 | 1 | −1 | 1 | 1 | 1 | 1 | −1 | −1 | −1 |
| 240 | 1 | 1 | 1 | −1 | 1 | 1 | 1 | 1 | −1 | 1 | −1 | −1 | 1 | 1 | −1 |
| 241 | 1 | 1 | 1 | 1 | −1 | −1 | −1 | −1 | 1 | −1 | 1 | −1 | −1 | 1 | 1 | 1 |
| 242 | 1 | 1 | 1 | 1 | −1 | −1 | −1 | 1 | 1 | −1 | 1 | 1 | 1 | −1 | 1 |
| 243 | 1 | 1 | 1 | 1 | −1 | −1 | 1 | −1 | 1 | −1 | 1 | 1 | −1 | 1 | 1 |
| 244 | 1 | 1 | 1 | 1 | −1 | −1 | 1 | 1 | −1 | 1 | −1 | −1 | 1 | −1 | 1 |
| 245 | 1 | 1 | 1 | 1 | −1 | 1 | −1 | −1 | 1 | 1 | −1 | −1 | 1 | 1 | 1 |
| 246 | 1 | 1 | 1 | 1 | −1 | 1 | −1 | 1 | −1 | −1 | 1 | −1 | −1 | 1 | 1 |
| 247 | 1 | 1 | 1 | 1 | −1 | 1 | 1 | −1 | −1 | 1 | 1 | −1 | 1 | −1 | −1 |
| 248 | 1 | 1 | 1 | 1 | −1 | 1 | 1 | 1 | 1 | −1 | 1 | −1 | −1 | −1 | 1 | −1 |
| 249 | 1 | 1 | 1 | 1 | 1 | −1 | −1 | −1 | 1 | −1 | 1 | 1 | −1 | 1 | 1 |
| 250 | 1 | 1 | 1 | 1 | 1 | −1 | −1 | 1 | −1 | 1 | 1 | −1 | −1 | 1 | 1 |
| 251 | 1 | 1 | 1 | 1 | 1 | −1 | 1 | −1 | −1 | 1 | −1 | 1 | 1 | 1 | −1 |
| 252 | 1 | 1 | 1 | 1 | 1 | −1 | 1 | 1 | 1 | −1 | 1 | −1 | 1 | −1 | −1 | 1 |
| 253 | 1 | 1 | 1 | 1 | 1 | 1 | −1 | −1 | 1 | −1 | 1 | −1 | 1 | −1 | 1 |
| 254 | 1 | 1 | 1 | 1 | 1 | 1 | −1 | 1 | 1 | −1 | 1 | −1 | −1 | 1 | −1 |
| 255 | 1 | 1 | 1 | 1 | 1 | 1 | 1 | −1 | −1 | −1 | −1 | −1 | −1 | −1 | −1 | 1 |
| 256 | 1 | 1 | 1 | 1 | 1 | 1 | 1 | 1 | 1 | 1 | 1 | 1 | 1 | 1 | 1 | 1 |

What is claimed is:

1. A method for processing data, the method comprising:
performing by one or more processors, one or more circuits, or any combination thereof:
generating a correlation vector by computing a correlation value for each codeword in a Nordstrom-Robinson codebook based on a received soft output codeword;
determining a maximum correlation value for each of a plurality of contiguous correlation value blocks in said correlation vector;
generating an updated correlation vector based on each of said determined maximum correlation value for said each of said plurality of contiguous correlation value blocks;
generating a plurality of correlation value groups, wherein each of said plurality of correlation value groups comprises a distinct portion of said updated correlation vector;
determining a group maximum correlation value for each of said plurality of correlation value groups; and
computing a log-likelihood value for a given bit corresponding to said received soft output codeword based on said group maximum correlation values.

2. The method according to claim 1, comprising determining a number of correlation values in said each of said plurality of contiguous correlation value blocks based on a bit index for said given bit corresponding to said received soft output codeword.

3. The method according to claim 1, comprising generating a distinct hypothesis value for said given bit for each of said plurality of correlation value groups.

4. The method according to claim 1, comprising determining a subsequent maximum correlation value for each of a plurality of contiguous pairs of correlation values in said updated correlation vector.

5. The method according to claim 4, comprising generating a subsequent updated correlation vector based on each of said determined subsequent maximum correlation value for said each of said plurality of contiguous pairs of correlation values.

6. The method according to claim 5, comprising generating a subsequent plurality of correlation value groups, wherein each of said generated subsequent plurality of correlation value groups comprises a distinct portion of said subsequent updated correlation vector.

7. The method according to claim 6, comprising determining a subsequent group maximum correlation value for each of said subsequent plurality of plurality of correlation value groups.

8. The method according to claim 7, comprising computing a subsequent log-likelihood value for a subsequent bit corresponding to said received soft output codeword based on said subsequent group maximum correlation values.

9. A non-transitory computer readable medium having stored thereon, a computer program having at least one code section for processing data, the at least one code section being executable by a computer for causing the computer to perform steps comprising:
generating a correlation vector by computing a correlation value for each codeword in a Nordstrom-Robinson codebook based on a received soft output codeword;
determining a maximum correlation value for each of a plurality of contiguous correlation value blocks in said correlation vector;
generating an updated correlation vector based on each of said determined maximum correlation value for said each of said plurality of contiguous correlation value blocks;
generating a plurality of correlation value groups, wherein each of said plurality of correlation value groups comprises a distinct portion of said updated correlation vector;
determining a group maximum correlation value for each of said plurality of correlation value groups; and
computing a log-likelihood value for a given bit corresponding to said received soft output codeword based on said group maximum correlation values.

10. The non-transitory computer readable medium according to claim 9, wherein said at least one code section comprises code for determining a number of correlation values in said each of said plurality of contiguous correlation value blocks based on a bit index for said given bit corresponding to said received soft output codeword.

11. The non-transitory computer readable medium according to claim 9, wherein said at least one code section comprises code for generating a distinct hypothesis value for said given bit for each of said plurality of correlation value groups.

12. The non-transitory computer readable medium according to claim 9, wherein said at least one code section comprises code for determining a subsequent maximum correlation value for each of a plurality of contiguous pairs of correlation values in said updated correlation vector.

13. The non-transitory computer readable medium according to claim 12, wherein said at least one code section comprises code for generating a subsequent updated correlation vector based on each of said determined subsequent maximum correlation value for said each of said plurality of contiguous pairs of correlation values.

14. The non-transitory computer readable medium according to claim 13, wherein said at least one code section comprises code for generating a subsequent plurality of correlation value groups, wherein each of said generated subsequent plurality of correlation value groups comprises a distinct portion of said subsequent updated correlation vector.

15. The non-transitory computer readable medium according to claim 14, wherein said at least one code section comprises code for determining a subsequent group maximum correlation value for each of said subsequent plurality of plurality of correlation value groups.

16. The non-transitory computer readable medium according to claim 15, wherein said at least one code section comprises code for computing a subsequent log-likelihood value for a subsequent bit corresponding to said received soft output codeword based on said subsequent group maximum correlation values.

17. A system for processing data, the system comprising:
one or more circuits that are operable to generate a correlation vector by computing a correlation value for each codeword in a Nordstrom-Robinson codebook based on a received soft output codeword;
said one or more circuits are operable to determine a maximum correlation value for each of a plurality of contiguous correlation value blocks in said correlation vector;
said one or more circuits are operable to generate an updated correlation vector based on each of said determined maximum correlation value for said each of said plurality of contiguous correlation value blocks;
said one or more circuits are operable to generate a plurality of correlation value groups, wherein each of said plurality of correlation value groups comprises a distinct portion of said updated correlation vector;

said one or more circuits are operable to determine a group maximum correlation value for each of said plurality of correlation value groups; and said one or more circuits are operable to compute a log-likelihood value for a given bit corresponding to said received soft output codeword based on said group maximum correlation values.

18. The system according to claim 17, wherein said one or more circuits are operable to determine a number of correlation values in said each of said plurality of contiguous correlation value blocks based on a bit index for said given bit corresponding to said received soft output codeword.

19. The system according to claim 17, wherein said one or more circuits are operable to generate a distinct hypothesis value for said given bit for each of said plurality of correlation value groups.

20. The system according to claim 17, wherein said one or more circuits are operable to determine a subsequent maximum correlation value for each of a plurality of contiguous pairs of correlation values in said updated correlation vector.

21. The system according to claim 20, wherein said one or more circuits are operable to generate a subsequent updated correlation vector based on each of said determined subsequent maximum correlation value for said each of said plurality of contiguous pairs of correlation values.

22. The system according to claim 21, wherein said one or more circuits are operable to generate a subsequent plurality of correlation value groups, wherein each of said subsequent plurality of correlation value groups comprises a distinct portion of said subsequent updated correlation vector.

23. The system according to claim 22, wherein said one or more circuits are operable to determine a subsequent group maximum correlation value for each of said subsequent plurality of plurality of correlation value groups.

24. The system according to claim 23, wherein said one or more circuits are operable to compute a subsequent log-likelihood value for a subsequent bit corresponding to said received soft output codeword based on said subsequent group maximum correlation values.

* * * * *